(12) United States Patent
Zhao et al.

(10) Patent No.: US 10,992,964 B2
(45) Date of Patent: Apr. 27, 2021

(54) METHOD AND APPARATUS FOR DETERMINING CODING TREE NODE SPLIT MODE AND CODING DEVICE

(71) Applicant: HUAWEI TECHNOLOGIES CO., LTD., Shenzhen (CN)

(72) Inventors: Yin Zhao, Hangzhou (CN); Haitao Yang, Shenzhen (CN); Shan Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/817,885

(22) Filed: Mar. 13, 2020

(65) Prior Publication Data
US 2020/0221140 A1    Jul. 9, 2020

Related U.S. Application Data

(63) Continuation of application No. PCT/CN2018/092572, filed on Jun. 25, 2018.

(30) Foreign Application Priority Data

Sep. 15, 2017 (CN) .......................... 201710834335.7

(51) Int. Cl.
*H04N 19/96* (2014.01)
*H04N 19/14* (2014.01)
*H04N 19/169* (2014.01)

(52) U.S. Cl.
CPC ............ *H04N 19/96* (2014.11); *H04N 19/14* (2014.11); *H04N 19/1883* (2014.11)

(58) Field of Classification Search
USPC .................................................... 375/240.26
See application file for complete search history.

(56) References Cited

U.S. PATENT DOCUMENTS

2016/0094829 A1* 3/2016 Georgiev ............... H04N 19/46
348/43
2017/0208336 A1    7/2017 Li et al.
(Continued)

FOREIGN PATENT DOCUMENTS

CN   103297774 A   9/2013
CN   105721865 A   6/2016
(Continued)

OTHER PUBLICATIONS

Xiang Li et al. Multi-Type-Tree, Joint Video Exploration Team (JVET) of ITU-T SG 16 WP 3 and ISO/IEC JTC 1/SC 29/WG 11, JVET-D0117r1, 4th Meeting: Chengdu, CN, Oct. 15, 2016. total 3 pages.
(Continued)

*Primary Examiner* — Behrooz M Senfi
(74) *Attorney, Agent, or Firm* — Rimon PC

(57) ABSTRACT

This application provides a method for determining a coding tree node split mode and a coding device. The method includes the step of determining a non-split based coding cost for coding a current image area corresponding to the current node and determining a binary tree split based coding cost for coding the current image area. The method further includes determining, based on the non-split based coding cost and the binary tree split based coding cost, whether a triple tree split based coding cost for coding the current image area needs to be obtained. If the triple tree split based coding cost needs to be obtained, a triple tree split is performed on the current node. The method then determines a split mode of the current node that corresponds to a minimum coding cost.

16 Claims, 7 Drawing Sheets

(56) References Cited

U.S. PATENT DOCUMENTS

| | | | |
|---|---|---|---|
| 2019/0246122 A1* | 8/2019 | Zhang | H04N 19/91 |
| 2020/0092587 A1* | 3/2020 | Zhao | H04N 19/182 |
| 2020/0195970 A1* | 6/2020 | Ikai | H04N 9/77 |

FOREIGN PATENT DOCUMENTS

| | | |
|---|---|---|
| CN | 106028047 A | 10/2016 |
| CN | 106937116 A | 7/2017 |
| WO | 2017008263 A1 | 1/2017 |

OTHER PUBLICATIONS

J. An et al., "Block partitioning structure for next generation video coding", ITU-T SG16 Doc. COM16-C966, Sep. 1, 2015. total 8 pages.

ITU-T H.265(Dec. 2016), Series H: Audiovisual and Multimedia Systems, Infrastructure of audiovisual services—Coding of moving video, High efficiency video coding, Dec. 1, 2016. total 664 pages.

\* cited by examiner

METHOD AND APPARATUS FOR DETERMINING CODING TREE NODE SPLIT MODE AND CODING DEVICE

CROSS-REFERENCE TO RELATED APPLICATIONS

This application is a continuation of International Application No. PCT/CN2018/092572, filed on Jun. 25, 2018, which claims priority to Chinese Patent Application No. 201710834335.7, filed on Sep. 15, 2017. The disclosures of the aforementioned applications are hereby incorporated by reference in their entireties.

TECHNICAL FIELD

This application relates to image processing technologies, and in particular, to a method and an apparatus for determining a coding tree node split mode and a coding device.

BACKGROUND

In the H.265 video coding standard, a frame of image is split into coding tree units (CTU) that do not overlap with each other. A CTU may be further split based on a quadtree (QT). Specifically, a CTU can be used as a root node of the quadtree, and a CTU can be recursively split into several leaf nodes in a quadtree split mode. Each node corresponds to one image area. If a node is not split, the node is referred to as a leaf node, and the image area corresponding to the leaf node forms a coding unit (CU). If a node is further split, the image area corresponding to the node is split into four image areas of a same size, and each image area corresponds to one node.

Further, a binary tree (BT) split or triple tree (TT) split may be further performed on the leaf node of the quadtree. The binary tree split may be a binary tree split in a horizontal direction or a binary tree split in a vertical direction. Similarly, the triple tree split may also be a triple tree split in a horizontal direction or a triple tree split in a vertical direction. Therefore, the leaf node of the quadtree may not be split, or may be split in the foregoing four split modes. Generally, a split mode with a minimum coding cost is determined for each node by using a rate distortion optimization (RDO) method. In the prior art, a coding cost is generated when a node is not split and the coding costs corresponding to the foregoing four split modes need to be separately determined, resulting in low coding efficiency.

SUMMARY

This application provides a method and an apparatus for determining a coding tree node split mode and a coding device, to improve coding efficiency.

According to a first aspect, this application provides a method for determining a coding tree node split mode, including: determining a non-split based coding cost for coding, when a current node is not split, a current image area corresponding to the current node; performing a binary tree split on the current node, and determining a binary tree split based coding cost for coding the current image area when binary tree split is performed on the current node; determining, based on the non-split based coding cost and the binary tree split based coding cost, whether a triple tree split based coding cost for coding the current image area when a triple tree split is performed on the current node needs to be obtained; if the triple tree split based coding cost for coding the current image area when the triple tree split is performed on the current node needs to be obtained, performing the triple tree split on the current node, and determining the triple tree split based coding cost; and determining, as a split mode of the current node, a split mode corresponding to a minimum coding cost in the determined coding costs of the current node.

Beneficial effects of this application are as follows. In this method, whether the triple tree split based coding cost for coding the current image area when a triple tree split is performed on the current node needs to be obtained may be determined based on the non-split based coding cost and the binary tree split based coding cost. Therefore, in some cases, an encoder side does not need to attempt all split modes, thereby improving coding efficiency.

Optionally, if the binary tree split based coding cost includes only a horizontal binary tree split based coding cost generated when a horizontal binary tree split is performed on the current node, the determining of whether a triple tree split based coding cost for coding the current image area when a triple tree split is performed on the current node needs to be obtained includes: if the non-split based coding cost is less than a product of the horizontal binary tree split based coding cost and a first preset threshold, determining that the triple tree split based coding cost does not need to be obtained; or if the non-split based coding cost is less than a product of the horizontal binary tree split based coding cost and a first preset threshold, and a coding tree depth of the current node is less than or equal to a second preset threshold, determining that the triple tree split based coding cost does not need to be obtained.

Beneficial effects of this application are as follows. When the non-split based coding cost is less than the product of the horizontal binary tree split based coding cost and the first preset threshold, or when the non-split based coding cost is less than the product of the horizontal binary tree split based coding cost and the first preset threshold, and the coding tree depth of the current node is less than or equal to the second preset threshold, a smaller quantity of times for which the current node is split indicates a better coding effect. In this case, it is determined that the triple tree split based coding cost does not need to be obtained, in other words, a triple tree split does not need to be performed on the current node. Therefore, coding efficiency is improved.

Optionally, if the binary tree split based coding cost includes only a vertical binary tree split based coding cost generated when a vertical binary tree split is performed on the current node, the determining of whether a triple tree split based coding cost for coding the current image area when a triple tree split is performed on the current node needs to be obtained includes: if the non-split based coding cost is less than a product of the vertical binary tree split based coding cost and a first preset threshold, determining that the triple tree split based coding cost does not need to be obtained; or if the non-split based coding cost is less than a product of the vertical binary tree split based coding cost and a first preset threshold, and a coding tree depth of the current node is less than or equal to a second preset threshold, determining that the triple tree split based coding cost does not need to be obtained.

Beneficial effects of this application are as follows. When the non-split based coding cost is less than the product of the vertical binary tree split based coding cost and the first preset threshold, or when the non-split based coding cost is less than the product of the vertical binary tree split based coding cost and the first preset threshold, and the coding tree depth of the current node is less than or equal to the second preset threshold, a smaller quantity of times for which the current node is split indicates a better coding effect. In this case, it is determined that the triple tree split based coding cost does not need to be obtained, in other words, a triple tree split does not need to be performed on the current node. Therefore, coding efficiency is improved.

Optionally, if the binary tree split based coding cost includes a horizontal binary tree split based coding cost generated when a horizontal binary tree split is performed on the current node and a vertical binary tree split coding based cost generated when a vertical binary tree split is performed on the current node, the determining of whether a triple tree split based coding cost for coding the current image area when a triple tree split is performed on the current node needs to be obtained includes: if the non-split based coding cost is less than a product of a minimum value of the horizontal binary tree split based coding cost and the vertical binary tree split based coding cost and a first preset threshold, determining that the triple tree split based coding cost does not need to be obtained; or if the non-split based coding cost is less than a product of a minimum value of the horizontal binary tree split based coding cost and the vertical binary tree split based coding cost and a first preset threshold, and a coding tree depth of the current node is less than or equal to a second preset threshold, determining that the triple tree split based coding cost does not need to be obtained.

Beneficial effects of this application are as follows. When the non-split based coding cost is less than the product of the minimum value of the horizontal binary tree split based coding cost and the vertical binary tree split based coding cost and the first preset threshold, or when the non-split based coding cost is less than the product of the minimum value of the horizontal binary tree split based coding cost and the vertical binary tree split based coding cost and the first preset threshold, and the coding tree depth of the current node is less than or equal to the second preset threshold, a smaller quantity of times for which the current node is split indicates a better coding effect. In this case, it is determined that the triple tree split based coding cost does not need to be obtained, in other words, a triple tree split does not need to be performed on the current node. Therefore, coding efficiency is improved.

Optionally, if the triple tree split includes a horizontal triple tree split and a vertical triple tree split, the performing triple tree split on the current node includes: if a width of the current image area is less than a height of the current image area, first performing the horizontal triple tree split on the current node, and then performing the vertical triple tree split on the current node; or if a width of the current image area is greater than or equal to a height of the current image area, first performing the vertical triple tree split on the current node, and then performing the horizontal triple tree split on the current node; or if a width of the current image area is less than or equal to a height of the current image area, first performing the horizontal triple tree split on the current node, and then performing the vertical triple tree split on the current node; or if a width of the current image area is greater than a height of the current image area, first performing the vertical triple tree split on the current node, and then performing the horizontal triple tree split on the current node.

Beneficial effects of this application are as follows. A split mode in which an image can be split into image areas of more appropriate sizes is first attempted because an image coding effect of the split mode is better. If the split mode is not as good as the non-split mode, based on this, another split mode may not be attempted, thereby improving coding efficiency.

Optionally, if a horizontal triple tree split is first performed on the current node, before the performing of a vertical triple tree split on the current node, the method further includes: determining whether the image distortion corresponding to the current image area when the current node is not split is the same as the image distortion corresponding to the current image area when the horizontal triple tree split is performed in the current image area; and performing the vertical triple tree split on the current node only when the image distortion corresponding to the current image area when the current node is not split is different from the image distortion corresponding to the current image area when the horizontal triple tree split is performed on the current node.

Alternatively, if a vertical triple tree split is first performed on the current node, before the performing of a horizontal triple tree split on the current node, the method further includes: determining whether the image distortion corresponding to the current image area when the current node is not split is the same as the image distortion corresponding to the current image area when the vertical triple tree split is performed in the current image area; and performing the horizontal triple tree split on the current node only when the image distortion corresponding to the current image area when the current node is not split is different from the image distortion corresponding to the current image area when the vertical triple tree split is performed on the current node.

Beneficial effects of this application are as follows. When it is determined, based on the non-split based coding cost and the binary tree split based coding cost, that a horizontal triple tree split and a vertical triple tree split need to be performed on the current node, further, the vertical triple tree split may be performed first, and then when the image distortion corresponding to the current image area when the current node is not split is the same as the image distortion corresponding to the current image area when the vertical triple tree split is performed on the current node, it is determined that the horizontal triple tree split does not need to be performed on the current node, or the horizontal triple tree split may be performed first, and then when the image distortion corresponding to the current image area when the current node is not split is the same as the image distortion corresponding to the current image area when the horizontal triple tree split is performed on the current node, it is determined that the vertical triple tree split does not need to be performed on the current node. Therefore, coding efficiency is improved.

Optionally, if a binary tree split includes a horizontal binary tree split and a vertical binary tree split, the performing binary tree split on the current node includes: if the width of the current image area is less than the height of the current image area, first performing the horizontal binary tree split on the current node, and then performing the vertical binary tree split on the current node; or if the width of the current image area is greater than or equal to the height of the current image area, first performing the vertical binary tree split on the current node, and then performing the horizontal binary tree split on the current node.

Alternatively, if the width of the current image area is less than or equal to the height of the current image area, first performing the horizontal binary tree split on the current node, and then performing the vertical binary tree split on the current node; or if the width of the current image area is greater than the height of the current image area, first performing the vertical binary tree split on the current node, and then performing the horizontal binary tree split on the current node.

Beneficial effects of this application are as follows. A split mode in which an image can be split into image areas of more appropriate sizes is first attempted because an image coding effect of the split mode is better. If the split mode is not as good as the non-split mode, another split mode may not be attempted, thereby improving coding efficiency.

Optionally, if a horizontal binary tree split is first performed on the current node, before the performing of a vertical binary tree split on the current node, the method further includes: determining whether the image distortion corresponding to the current image area when the current node is not split is the same as the image distortion corresponding to the current image area when the horizontal binary tree split is performed in the current image area; and performing the vertical binary tree split on the current node only when the image distortion corresponding to the current image area when the current node is not split is different from the image distortion corresponding to the current image area when the horizontal binary tree split is performed on the current node.

Alternatively, if a vertical binary tree split is first performed on the current node, before the performing of a horizontal binary tree split on the current node, the method further includes: determining whether the image distortion corresponding to the current image area when the current node is not split is the same as the image distortion corresponding to the current image area when the vertical binary tree split is performed in the current image area; and performing the horizontal binary tree split on the current node only when the image distortion corresponding to the current image area when the current node is not split is different from the image distortion corresponding to the current image area when the vertical binary tree split is performed on the current node.

Beneficial effects of this application are as follows. A vertical binary tree split may be performed first, and then when the image distortion corresponding to the current image area when the current node is not split is the same as the image distortion corresponding to the current image area when the vertical binary tree split is performed on the current node, it is determined that a horizontal binary tree split does not need to be performed on the current node, or a horizontal binary tree split may be performed first, and then when the image distortion corresponding to the current image area when the current node is not split is the same as the image distortion corresponding to the current image area when the horizontal binary tree split is performed on the current node, it is determined that the vertical binary tree split does not need to be performed on the current node. Therefore, coding efficiency is improved.

According to a second aspect, this application provides a method for determining a coding tree node split mode, including: determining a horizontal binary tree split based coding cost for coding, when a horizontal binary tree split is performed on a current node, a current image area corresponding to the current node; determining a vertical binary tree split based coding cost for coding the current image area when a vertical binary tree split is performed on the current node; determining, based on the horizontal binary tree split based coding cost and the vertical binary tree split based coding cost, whether a triple tree split based coding cost for coding the current image area when a triple tree split is performed on the current node needs to be obtained, and the triple tree split includes at least one of a horizontal triple tree split and a vertical triple tree split; and if the triple tree split based coding cost for coding the current image area when a triple tree split is performed on the current node needs to be obtained, performing the triple tree split on the current node, and determining the triple tree split based coding cost; and determining, as a split mode of the current node, a split mode corresponding to a minimum coding cost in the determined coding costs of the current node.

Beneficial effects of this application are as follows. In this method, whether the triple tree split based coding cost for coding the current image area when the triple tree split is performed on the current node needs to be obtained may be determined based on the horizontal binary split based coding cost and the vertical binary tree split based coding cost. Therefore, in some cases, an encoder side does not need to attempt all split modes, thereby improving coding efficiency.

Optionally, if the triple tree split includes a horizontal triple tree split and a vertical triple tree split, the determining of whether a triple tree split based coding cost for coding the current image area when triple tree split is performed on the current node needs to be obtained includes: if the horizontal binary tree split based coding cost is greater than a product of the vertical binary tree split based coding cost and a first preset threshold, determining that the horizontal triple tree split based coding cost does not need to be obtained; or if the vertical binary tree split based coding cost is greater than a product of the horizontal binary tree split based coding cost and a second preset threshold, determining that the vertical triple tree split based coding cost does not need to be obtained.

Beneficial effects of this application are as follows. When the horizontal binary tree split based coding cost is greater than the product of the vertical binary tree split based coding cost and the first preset threshold, it indicates that the coding efficiency by using the horizontal binary tree split is lower than that by using the vertical binary tree split. Because a split direction of the horizontal triple tree split is the same as that of the horizontal binary tree split, a split direction of the vertical triple tree split is the same as that of the vertical binary tree split. Based on this, it may be inferred that the coding efficiency by using the horizontal triple tree split is lower than the coding efficiency by using the vertical triple tree split. Therefore, it may be determined that the horizontal triple tree split based coding cost does not need to be obtained. Similarly, when the vertical binary tree split based coding cost is greater than the product of the horizontal binary tree split based coding cost and the second preset threshold, it indicates that the coding efficiency by using the horizontal binary tree split is higher than that by using the vertical binary tree split, and because a split direction of the horizontal triple tree split is the same as that of the horizontal binary tree split, a split direction of the vertical triple tree split is the same as that of the vertical binary tree split. Based on this, it may be inferred that the coding efficiency by using the horizontal triple tree split is higher than the coding efficiency by using the vertical triple tree split. Therefore, it may be determined that the vertical triple tree split based coding cost does not need to be obtained. Therefore, coding efficiency is improved.

The following describes an apparatus for determining a coding tree node split mode and a coding device. Implementation principles and technical effects thereof are similar to the foregoing principles and technical effects. Details are not described herein again.

According to a third aspect, this application provides an apparatus for determining a coding tree node split mode, including a determining module, a judging module, and a splitting module.

The determining module is configured to determine a non-split based coding cost for coding, when a current node is not split, a current image area corresponding to the current node. The splitting module is configured to perform a binary tree split on the current node. The determining module is further configured to determine a binary tree split based coding cost for coding the current image area when the binary tree split is performed on the current node; the judging module is configured to determine, based on the non-split based coding cost and the binary tree split based coding cost, whether a triple tree split based coding cost for coding the current image area when a triple tree split is performed on the current node needs to be obtained; the splitting module is further configured to: if the judging module determines that the triple tree split based coding cost for coding the current image area when a triple tree split is performed on the current node needs to be obtained, perform the triple tree split on the current node; and the determining module is further configured to determine the triple tree split based coding cost, and determine, as a split mode of the current node, a split mode corresponding to a minimum coding cost in the determined coding costs of the current node.

According to a fourth aspect, this application provides an apparatus for determining a coding tree node split mode, including a determining module, a judging module, and a splitting module.

The determining module is configured to determine a horizontal binary tree split based coding cost for coding, when a horizontal binary tree split is performed on a current node, a current image area corresponding to the current node; the determining module is further configured to determine a vertical binary tree split based coding cost for coding the current image area when a vertical binary tree split is performed on the current node; the judging module is configured to determine, based on the horizontal binary tree split based coding cost and the vertical binary tree split based coding cost, whether a triple tree split based coding cost for coding the current image area when a triple tree split is performed on the current node needs to be obtained, and the triple tree split includes at least one of a horizontal triple tree split and a vertical triple tree split; the splitting module is configured to: if the judging module determines that the triple tree split based coding cost for coding the current image area when a triple tree split is performed on the current node needs to be obtained, perform the triple tree split on the current node; and the determining module is further configured to determine the triple tree split based coding cost, and determine, as a split mode of the current node, a split mode corresponding to a minimum coding cost in the determined coding costs of the current node.

According to a fifth aspect, this application provides a coding device, including a processor and a memory. The memory is configured to store an execution instruction of the processor. The processor is configured to: determine a non-split based coding cost for coding, when a current node is not split, a current image area corresponding to the current node; perform a binary tree split on the current node, and determine a binary tree split based coding cost for coding the current image area when the binary tree split is performed on the current node; determine, based on the non-split based coding cost and the binary tree split based coding cost, whether a triple tree split based coding cost for coding the current image area when a triple tree split is performed on the current node needs to be obtained; if the triple tree split based coding cost for coding the current image area when the triple tree split is performed on the current node needs to be obtained, perform the triple tree split on the current node; and determine the triple tree split based coding cost, and determine, as a split mode of the current node, a split mode corresponding to a minimum coding cost in the determined coding costs of the current node.

According to a sixth aspect, this application provides a coding device, including: a processor and a memory. The memory is configured to store an execution instruction of the processor. The processor is configured to: determine a horizontal binary tree split based coding cost for coding, when a horizontal binary tree split is performed on a current node, a current image area corresponding to the current node; determine a vertical binary tree split based coding cost for coding the current image area when a vertical binary tree split is performed on the current node; determine, based on the horizontal binary tree split based coding cost and the vertical binary tree split based coding cost, whether a triple tree split based coding cost for coding the current image area when a triple tree split is performed on the current node needs to be obtained, and the triple tree split includes at least one of a horizontal triple tree split and a vertical triple tree split; if the triple tree split based coding cost for coding the current image area when the triple tree split is performed on the current node needs to be obtained, perform the triple tree split on the current node; and determine the triple tree split based coding cost, and determine, as a split mode of the current node, a split mode corresponding to a minimum coding cost in the determined coding costs of the current node.

According to a seventh aspect, this application provides a coding device. The device includes an encoder configured to perform the following operations:

determining a non-split based coding cost for coding, when a current node is not split, a current image area corresponding to the current node; performing a binary tree split on the current node, and determining a binary tree split based coding cost for coding the current image area when the binary tree split is performed on the current node; determining, based on the non-split based coding cost and the binary tree split based coding cost, whether a triple tree split based coding cost for coding the current image area when a triple tree split is performed on the current node needs to be obtained; if the triple tree split based coding cost for coding the current image area when the triple tree split is performed on the current node needs to be obtained, performing the triple tree split on the current node; and determining the triple tree split based coding cost, and determining, as a split mode of the current node, a split mode corresponding to a minimum coding cost in the determined coding costs of the current node.

According to an eighth aspect, this application provides a coding device. The device includes an encoder configured to perform the following operations:

determining a horizontal binary tree split based coding cost for coding, when a horizontal binary tree split is performed on a current node, a current image area corresponding to the current node; determining a vertical binary tree split based coding cost for coding the current image area when a vertical binary tree split is performed on the current node; determining, based on the horizontal binary tree split based coding cost and the vertical binary tree split based coding cost, whether a triple tree split based coding cost for coding the current image area when a triple tree split is performed on the current node needs to be obtained, and the triple tree split includes at least one of a horizontal triple tree split and a vertical triple tree split; and if the triple tree split based coding cost for coding the current image area when the triple tree split is performed on the current node needs to be obtained, performing the triple tree split on the current node; and determining the triple tree split based coding cost, and determining, as a split mode of the current node, a split mode corresponding to a minimum coding cost in the determined coding costs of the current node.

According to a ninth aspect, this application provides a computer storage medium, configured to store a computer software instruction used by the coding device in the fifth aspect or the seventh aspect. The computer software instruction includes a program designed for performing the fifth aspect or the seventh aspect.

According to a tenth aspect, this application provides a computer program product, including an instruction. When the computer program is executed by a computer, the instruction enables the computer to perform a function performed by the coding device in the fifth aspect or the seventh aspect.

According to an eleventh aspect, this application provides a computer storage medium, configured to store a computer software instruction used by the coding device in the sixth aspect or the eighth aspect. The computer software instruction includes a program designed for performing the sixth aspect or the eighth aspect.

According to a twelfth aspect, this application provides a computer program product, including an instruction. When the computer program is executed by a computer, the instruction enables the computer to perform a function performed by the coding device in the sixth aspect or the eighth aspect.

This application provides the method and the apparatus for determining the coding tree node split mode and the coding device. In this method, whether the triple tree split based coding cost for coding the current image area when a triple tree split is performed on the current node needs to be obtained may be determined based on the non-split based coding cost and the binary tree split based coding cost. Therefore, in some cases, the encoder side does not need to attempt all split modes, thereby improving coding efficiency. Further, if the image distortion corresponding to the current image area when the current node is not split is the same as the image distortion corresponding to the current image area when a horizontal binary tree split is performed in the current image area, a vertical binary tree split does not need to be performed on the current node; or if the image distortion corresponding to the current image area when the current node is not split is the same as the image distortion corresponding to the current image area when a vertical binary tree split is performed in the current image area, a horizontal binary tree split does not need to be performed on the current node. Further, if the image distortion corresponding to the current image area when the current node is not split is the same as the image distortion corresponding to the current image area when a horizontal triple tree split is performed on the current node, a vertical triple tree split does not need to be performed on the current node; or if the image distortion corresponding to the current image area when the current node is not split is the same as the image distortion corresponding to the current image area when a vertical triple tree split is performed on the current node, the horizontal triple tree split performed on the current node is skipped. Further, coding efficiency can be improved.

DETAILED DESCRIPTION

In the following, some professional terms in this application are described, to help persons skilled in the art achieve a better understanding.

CTU: One image includes a plurality of CTUs, and one CTU generally corresponds to one rectangular image area and includes luminance pixels and/or chrominance pixels in the image area. A CTU further includes syntax elements, and these syntax elements indicate how to split the CTU into at least one CU and a method for decoding each coding unit to obtain a reconstructed image.

CU: A CU is a leaf node of a coding tree, generally corresponds to one rectangular area of A×B, and includes luminance pixels/chrominance pixels of the rectangular area. A is a width of the rectangle, and B is a height of the rectangle. A and B may be the same or different, and a value of A and B is usually an integral power of 2, for example, 256, 128, 64, 32, 16, 8, and 4. One CU can obtain a reconstructed image of one rectangular area of A×B through decoding processing.

Figure 1A:
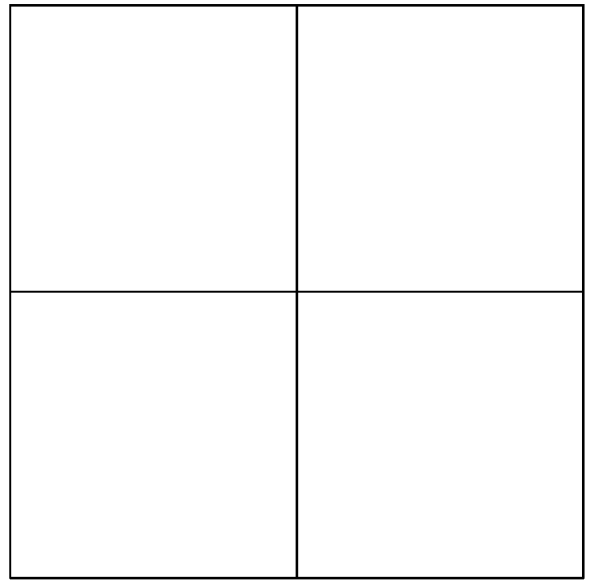
FIG. 1A is a schematic diagram of splitting an image area in a quadtree split mode.

Quadtree: A quadtree is a tree structure, and each node of a quadtree can be split into four child nodes. A CTU may be recursively split into several leaf nodes (CU) in a quadtree split mode. One node corresponds to one image area. If a node is not split, the node is referred to as a leaf node, and an image area corresponding to the leaf node forms a CU. If a node is further split, an image area corresponding to the node is split into four image areas of a same size, and each image area corresponds to one node. FIG. 1A is a schematic diagram of splitting an image area in a quadtree split mode.

As shown in FIG. 1A, an image area corresponding to a node is split into four image areas of a same size, and each image area obtained through splitting corresponds to one node.

Figure 1B:
FIG. 1B is a schematic diagram of splitting an image area in a horizontal binary tree split mode.
Figure 1C:
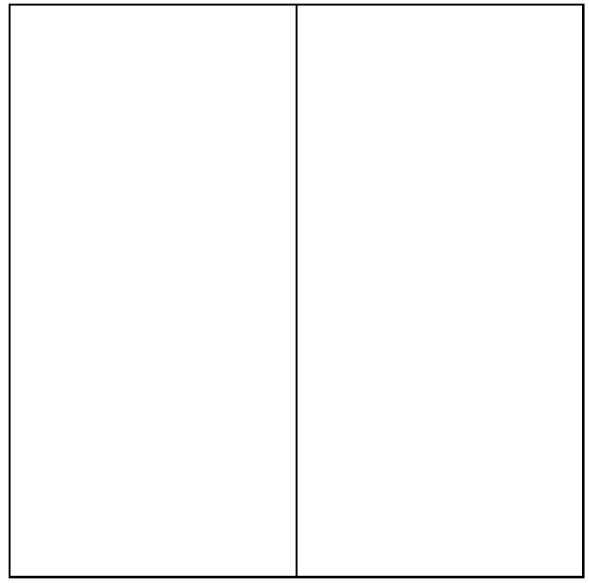
FIG. 1C is a schematic diagram of splitting an image area in a vertical binary tree split mode.

Binary tree: Binary tree is a tree structure, and each node of a binary tree can be split into two child nodes. A split direction of binary tree split may be a horizontal direction or a vertical direction. For example, FIG. 1B is a schematic diagram of splitting an image area in a horizontal binary tree split mode, and FIG. 1C is a schematic diagram of splitting an image area in a vertical binary tree split mode. As shown in FIG. 1B, an image area corresponding to a node is split into two image areas of a same size: an upper image area and a lower image area, and each image area obtained through splitting corresponds to one node. As shown in FIG. 1C, an image area corresponding to a node is split into two image areas of a same size: a left image area and a right image area, and each image area obtained through splitting corresponds to one node.

Figure 1D:
FIG. 1D is a schematic diagram of splitting an image area in a horizontal triple tree split mode.
Figure 1E:
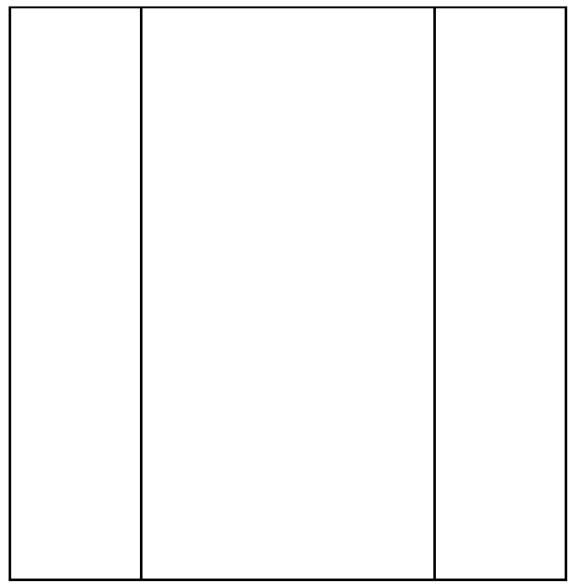
FIG. 1E is a schematic diagram of splitting an image area in a vertical triple tree split mode.

Triple tree: Triple tree is a tree structure, and each node of a triple tree can be split into three child nodes. A split direction of triple tree split may be a horizontal direction or a vertical direction. For example, FIG. 1D is a schematic diagram of splitting an image area in a horizontal triple tree split mode, and FIG. 1E is a schematic diagram of splitting an image area in a vertical triple tree split mode. As shown in FIG. 1D, an image area corresponding to a node is split into three image areas: an upper image area, a middle image area, and a lower image area, and each image area obtained through splitting corresponds to one node. Heights of the three image areas are respectively ¼, ½, and ¼ of a height of the entire image area. As shown in FIG. 1E, an image area corresponding to a node is split into three image areas: a left image area, a middle image area, and a right image area, and each image area obtained through splitting corresponds to one node. Widths of the three image areas are respectively ¼, ½, and ¼ of a width of the entire image area.

QT-BT split mode: A CTU is first split based on a QT, and a leaf node of the QT is allowed to be further split based on a BT. In other words, a coding tree is split into two levels. A first-level coding tree corresponds to the QT, and a second-level coding tree corresponds to the BT.

QT-TT split mode: A CTU is first split based on a QT, and a leaf node of the QT is allowed to be further split based on a TT. In other words, a coding tree is split into two levels. A first-level coding tree corresponds to the QT, and a second-level coding tree corresponds to the TT.

QT-(BT and/or TT) split mode: A CTU is first split based on a QT, and a leaf node of the QT is allowed to be further split based on a BT or a TT. A node of the BT is allowed to be split based on the BT or the TT, and a node of the TT is allowed to be split based on the BT or the TT. In other words, a coding tree is split into two levels. A first-level coding tree corresponds to the QT, and a second-level coding tree corresponds to the BT and/or the TT.

Cascaded coding tree: A coding tree includes a multi-level coding tree. For example, a cascaded coding tree based on a QT-BT, a QT-TT, or a QT-(BT and/or TT) split mode includes a two-level coding tree. How to set the level of the coding tree is not limited in this application.

Non-cascaded coding tree: A coding tree includes only one-level coding tree. For example, a QT coding tree, a BT coding tree, and a TT coding tree are non-cascaded coding trees.

Figure 2A:
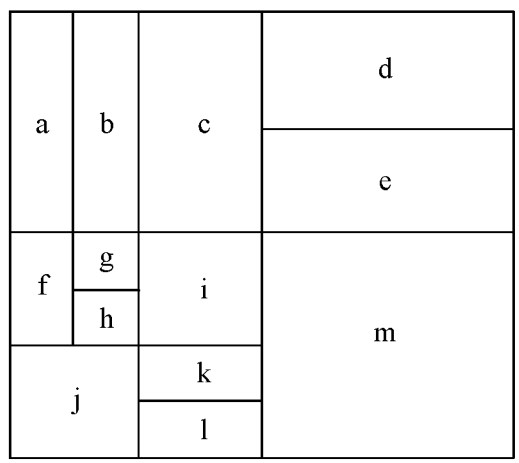
FIG. 2A is a schematic diagram of splitting an image area in a QT-BT split mode.
Figure 2B:
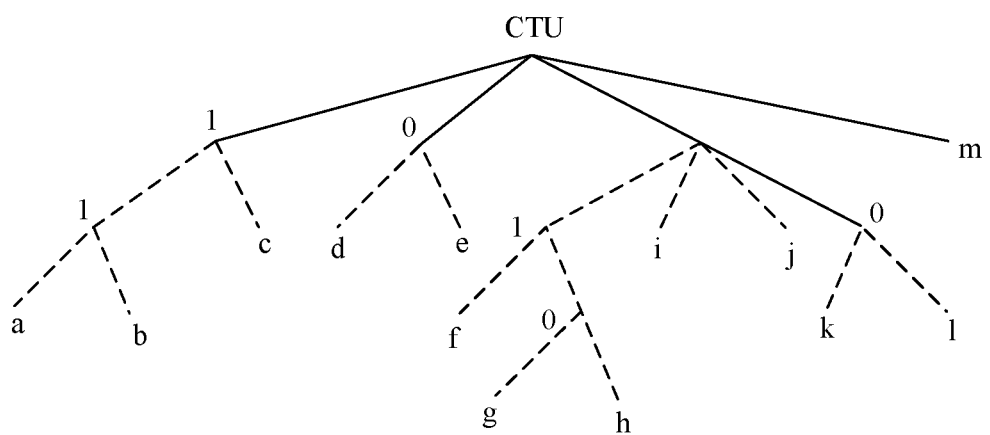
FIG. 2B is a schematic diagram of a coding tree corresponding to a QT-BT split mode.

Coding tree depth: If a coding tree is a cascaded coding tree (including N depths), the coding tree depth is classified into: a depth of a first-level coding tree, a depth of a second-level coding tree, . . . , and a depth of an $N^{th}$-level coding tree. A coding tree in a QT-BT split mode is used as an example. FIG. 2A is a schematic diagram of splitting an image area in a QT-BT split mode, and FIG. 2B is a schematic diagram of a coding tree corresponding to a QT-BT split mode. Description is provided with reference to FIG. 2A and FIG. 2B. A first-level coding tree corresponds to the QT, and a second-level coding tree corresponds to the BT. a to m are 13 leaf nodes, and each leaf node corresponds to one CU. On a binary tree node, 1 indicates vertical split, and 0 indicates horizontal split. Each node has a QT depth and a BT depth. For example, a QT depth of a and b is 1, and a BT depth of a and b is 2; a QT depth of c, d, and e is 1, and a BT depth of c, d, and e is 1; a QT depth off, k, and 1 is 2, and a BT depth off, k, and 1 is 1; a QT depth of i and j is 2, and a BT depth of i and j is 0; a QT depth of g and h is 2, and a BT depth of g and his 2; and a QT depth of m is 1, and a BT depth of m is 0. If the coding tree is a non-cascaded coding tree, the coding tree depth is the depth of the coding tree. For example, each node of the QT coding tree has only one QT depth.

Video encoding: After receiving a video, an encoder side splits each frame of image that constitutes the video into to-be-coded image blocks, and performs coding in a sequence of the to-be-coded image blocks. For a current to-be-coded image block, the current to-be-coded image block is first predicted by using a reference reconstructed image block, to obtain a prediction signal of the current to-be-coded image block; and the prediction signal is subtracted from an original signal of the current to-be-coded image block to obtain a residual signal. After the prediction, an amplitude of the residual signal is far less than that of the original signal. Transform (optional) and quantization operations are performed on the residual signal. A quantization coefficient is obtained after the transform and quantization operations are performed, and then an entropy encoding operation is performed on the quantization coefficient by using an entropy encoding technology such as variable-length coding or binary encoding, to obtain a data stream. The data stream generally includes splitting information of the current to-be-encoded image block, coding mode information, and the like. Further, the encoder side further needs to reconstruct the current to-be-coded image block, to provide a reference pixel for subsequent coding of the to-be-coded image block. Specifically, after obtaining the quantization coefficient of the current to-be-coded image block, the encoder side needs to perform dequantization and inverse transform on the quantization coefficient of the current to-be-coded image block, to obtain a reconstructed residual signal; add the reconstructed residual signal and the prediction signal corresponding to the current to-be-coded image block, to obtain a reconstructed signal of the current to-be-coded image block; and obtain a reconstructed image block based on the reconstructed signal.

RDO: The RDO is an optimization method for improving video compression performance. The principle of rate-distortion optimization is to simultaneously optimize a loss (image quality) and a bit rate (a data amount required for coding) of a video, to achieve an optimal balance. This algorithm is initially used in an encoder for video compression. However, this algorithm can also be used to code multimedia including videos and audio, provided that both the quality and file size are considered during coding.

Based on the foregoing description of the professional terms, the following provides a method for determining a coding tree node split mode and a device.

In some embodiments, for the QT-(BT and/or TT) split mode, a leaf node of the QT may not be split, or may be split in the foregoing four split modes. Similarly, each node of the BT and each node of the TT may not be split, or may be split in the foregoing four split modes. For each of these nodes, in the prior art, a coding cost is generated even when a node is not split and coding costs corresponding to the foregoing four split modes need to be separately determined, and consequently a problem of low coding efficiency is caused.

It should be noted that this application is not limited to the QT-BT and/or QT-TT split mode. The solutions provided in this application may be used provided that there is a possibility that a node is not split, or is split in the foregoing four split modes. For example, a coding tree corresponds to a BT and/or a TT, in other words, the coding tree is a non-cascaded coding tree. There is a possibility that a node of the coding tree is not split, or is split in the foregoing four split modes.

Figure 3:
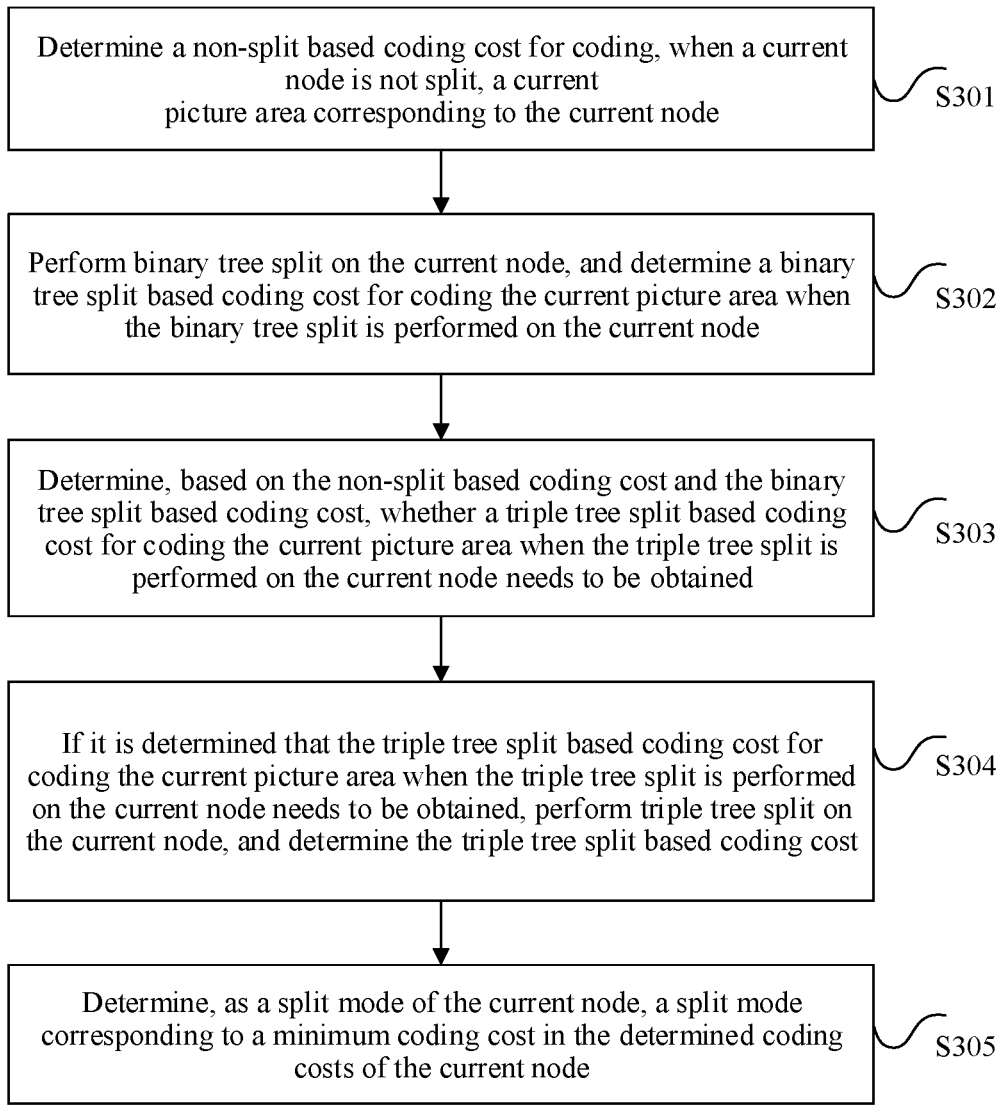
FIG. 3 is a flowchart of a method for determining a coding tree node split mode according to an embodiment of this application.

To resolve the foregoing technical problem, this application provides a method for determining a coding tree node split mode and a device. Specifically, FIG. 3 is a flowchart of a method for determining a coding tree node split mode according to an embodiment of this application. As shown in FIG. 3, the method includes the following steps:

Step S301: Determine a non-split based coding cost for coding a current image area corresponding to the current node when a current node is not split.

Step S302: Perform a binary tree split on the current node, and determine a binary tree split based coding cost for coding the current image area when the binary tree split is performed on the current node.

Step S303: Determine, based on the non-split based coding cost and the binary tree split based coding cost, whether a triple tree split based coding cost for coding the current image area when a triple tree split is performed on the current node needs to be obtained.

Step S304: If the triple tree split based coding cost for coding the current image area when a triple tree split is performed on the current node needs to be obtained, perform the triple tree split on the current node, and determine the triple tree split based coding cost.

Step S305: Determine, as a split mode of the current node, a split mode corresponding to a minimum coding cost in the determined coding costs of the current node.

Step S301 is described in detail: The current node corresponds to at least one coding mode, and each coding mode includes a coding scheme, a prediction mode, a transform mode, and the like.

The coding scheme may be an original-resolution-based coding scheme, a down-sampling-based coding scheme, or the like. The original-resolution-based coding scheme is a coding operation directly performed on the current image area corresponding to the current node. The down-sampling-based coding scheme is a scheme in which the current image area is first down-sampled, and then a coding operation is performed on the down-sampled current image area.

The prediction mode is an intra prediction mode or an inter prediction mode, and the intra prediction mode may be any one of a Planar mode, a DC mode, and 33 angle prediction modes.

In a transform mode, a transform operation is first performed on a residual signal of the current image area, and then a quantization operation is performed. In another transform mode, a quantization operation is directly performed on a residual signal.

The coding scheme, the prediction mode, and the transform mode are not limited to the foregoing content. This is not limited in this application.

The encoder side may calculate a coding cost of the current node, that is, a coding cost of the current image area, by using an RDO method. Optionally, the encoder side may determine, for each coding mode of the current image area, a reconstructed image corresponding to the current image area. Coding distortion is determined based on a pixel of the reconstructed image and a pixel of the current image area. A quantity of coding bits in the current image area is determined based on information such as a coding mode and a transform coefficient that correspond to the reconstructed image, and a coding cost is obtained based on a weighted value of the coding distortion and the quantity of coding bits. A smaller coding cost indicates better coding performance. For example, when the coding scheme included in the coding mode of the current image area is an original-resolution-based coding scheme, the prediction mode is an intra prediction mode, and the transform mode is the first transformation mode, the process of calculating the coding cost of the current image area includes the following steps: (1) obtaining a quantization coefficient of the current image area by using the coding mode of the current image area, and after obtaining the quantization coefficient of the current image area, the encoder side needs to perform dequantization on the quantization coefficient based on a quantization parameter to obtain a transform coefficient, and then perform inverse transform on the transform coefficient to obtain a reconstructed residual signal; (2) adding the reconstructed residual signal and a prediction signal of the current image area to obtain a reconstructed signal of the current image area; and (3) obtaining, based on the reconstructed signal, a reconstructed image block corresponding to the current image area. An error between the reconstructed image block and the current image area is calculated. A smaller error indicates smaller coding distortion. Calculating the error between the reconstructed image block and the current image area includes: calculating a difference between each pixel of the reconstructed image block and a pixel corresponding to the current image area to obtain a corresponding difference; and calculating a weighted average value of all differences of the reconstructed image block, to finally obtain the error between the reconstructed image block and the current image area. Entropy coding is performed on syntax elements such as the coding mode and the transform coefficient that correspond to the reconstructed image block, to obtain the quantity of coded bits in the current image area. Weighted summation is performed on the coding distortion and the quantity of coding bits to obtain the coding cost. Finally, a minimum coding cost corresponding to the current node is used as the non-split based coding cost.

It should be noted that, the reconstructed image block corresponding to the current image area may be determined, and the error between the reconstructed image block and the current image area may be calculated by using an existing technology. This is not limited in this application.

Optionally, before step S302, the method further includes determining whether a binary tree split based coding cost and a triple tree split based coding cost need to be obtained. If the binary tree split based coding cost and the triple tree split based coding cost need to be obtained, step S302 to step S305 are performed; or if the binary tree split based coding cost and the triple tree split based coding cost do not need to be obtained, step S302 to step S304 are skipped, and step S305 is directly performed.

Specifically, whether the binary tree split based coding cost and the triple tree split based coding cost need to be obtained may be determined in the following two optional manners:

In a first optional manner, whether a prediction mode of a corresponding optimal coding mode used when the current node is not split is a skip mode is determined. If the prediction mode of the corresponding optimal coding mode used when the current node is not split is the skip mode, it indicates that the binary tree split based coding cost and the triple tree split based coding cost do not need to be obtained; or if the prediction mode of the corresponding optimal coding mode used when the current node is not split is the skip mode, it indicates that the binary tree split based coding cost and the triple tree split based coding cost need to be obtained. The optimal coding mode is a coding mode corresponding to the non-split based coding cost.

In a second optional manner, whether the binary tree split based coding cost and the triple tree split based coding cost need to be obtained may be determined based on a width of the current image area, a height of the current image area, and a coding tree depth of the current node.

It should be noted that, in this application, the coding tree depth of the current node is the depth of the current node in a one-level coding tree that is split based on a BT and/or TT and to which the current node belongs. For example, if a BT and/or TT coding tree is used to split a CTU into CUs, a coding tree depth of a current node is the depth of the current node relative to the CTU. If a QT-BT and/or QT-TT) cascaded coding tree is used to split a CTU into CUs, a coding tree depth of a current node is the depth of the current node in a second-level coding tree of a QT leaf node.

Whether the binary tree split based coding cost and the triple tree split based coding cost need to be obtained based on the width and the height of the current image area and the coding tree depth of the current node may be determined in the following several optional manners.

Optional manner 1: If the depth of the second-level coding tree of the current node is greater than or equal to a preset threshold maxSTDepth, it is determined that the binary tree split based coding cost and the triple tree split based coding cost do not need to be obtained, where maxSTDepth is an allowed maximum value of the depth of the second-level coding tree.

Optional manner 2: If the width or the height of the current image area is equal to a preset threshold minCUSize, or if the width or the height of the current image area is less than or equal to a preset threshold minCUSize×2, it is determined that the binary tree split based coding cost and the triple tree split based coding cost do not need to be obtained.

Optional manner 3: If the width or the height of the current image area is greater than a preset threshold maxSTSize, it is determined that the binary tree split based coding cost and the triple tree split based coding cost do not need to be obtained.

Optional manner 4: If a minimum value of the width and the height of the current image area is less than or equal to a preset threshold minCUSize, it is determined that the binary tree split based coding cost and the triple tree split based coding cost do not need to be obtained.

Optional manner 5: If a ratio of a long side to a short side of the current image area is greater than or equal to a preset threshold, it is determined that the binary tree split based coding cost and the triple tree split based coding cost do not need to be obtained.

Step S302 is described in detail: The binary tree split includes a horizontal binary tree split and/or a vertical binary tree split.

Optionally, if the binary tree split includes a horizontal binary tree split and a vertical binary tree split, the performing binary tree split on the current node includes: if the width of the current image area is less than the height of the current image area, first performing the horizontal binary tree split on the current node, and then performing the vertical binary tree split on the current node; or if the width of the current image area is greater than or equal to the height of the current image area, first performing the vertical binary tree split on the current node, and then performing the horizontal binary tree split on the current node; In other words, a split mode in which an image can be split into image areas of more appropriate sizes is first attempted because an image coding effect of the split mode is better. If the split mode is not as good as the non-split mode, based on this, another split mode may not be attempted, thereby improving coding efficiency.

Alternatively, if the width of the current image area is less than or equal to the height of the current image area, first performing a horizontal binary tree split on the current node, and then performing a vertical binary tree split on the current node; or if the width of the current image area is greater than the height of the current image area, first performing the vertical binary tree split on the current node, and then performing the horizontal binary tree split on the current node. In other words, a split mode in which an image can be split into image areas of more appropriate sizes is first attempted because the image coding effect of the split mode is better. If the split mode is not as good as the non-split mode, based on this, another split mode may not be attempted, thereby improving coding efficiency.

Optionally, if a horizontal binary tree split is first performed on the current node, before the performing of a vertical binary tree split on the current node, the method further includes: determining whether image distortion corresponding to the current image area when the current node is not split is the same as image distortion corresponding to the current image area when the horizontal binary tree split is performed in the current image area; and performing the vertical binary tree split on the current node only when the image distortion corresponding to the current image area when the current node is not split is different from the image distortion corresponding to the current image area when the horizontal binary tree split is performed on the current node.

Alternatively, if a vertical binary tree split is first performed on the current node, before the performing a horizontal binary tree split on the current node, the method further includes: determining whether image distortion corresponding to the current image area when the current node is not split is the same as image distortion corresponding to the current image area when the vertical binary tree split is performed in the current image area; and performing the horizontal binary tree split on the current node only when the image distortion corresponding to the current image area when the current node is not split is different from the image distortion corresponding to the current image area when the vertical binary tree split is performed on the current node.

It is assumed that a corresponding reconstructed image determined when the current node is not split is a first reconstructed image, and a corresponding reconstructed image generated when a horizontal binary tree split is performed on the current node is a second reconstructed image. The determining of whether image distortion corresponding to the current image area when the current node is not split is the same as image distortion corresponding to the current image area when the horizontal binary tree split is performed on the current node includes: determining whether a sum of distortion of all pixels of the first reconstructed image is the same as a sum of distortion of all pixels of the second reconstructed image, or whether distortion of each pixel of the first reconstructed image is the same as distortion of a corresponding pixel of the second reconstructed image. Both the distortion of the first reconstructed image and the distortion of the second reconstructed image are for the current image area. For example, distortion of a pixel A of the first reconstructed image may be a pixel difference between the pixel A and a pixel B that corresponds to the pixel A and that is in the current image area. The sum of the distortions of all the pixels of the reconstructed image may be measured by using a sum of squared differences (SSD) or a sum of absolute differences (SAD).

It is assumed that a corresponding reconstructed image generated when the current node is not split is a first reconstructed image, and a corresponding reconstructed image generated when a vertical binary tree split is performed on the current node is a third reconstructed image. The determining of whether image distortion corresponding to the current image area when the current node is not split is the same as image distortion corresponding to the current image area when a vertical binary tree split is performed on the current node includes: determining whether a sum of distortion of all pixels of the first reconstructed image is the same as a sum of distortion of all pixels of the third reconstructed image, or whether distortion of each pixel of the first reconstructed image is the same as distortion of a corresponding pixel of the third reconstructed image. Both the distortion of the first reconstructed image and the distortion of the third reconstructed image are for the current image area. For example, distortion of a pixel A of the first reconstructed image may be a pixel difference between the pixel A and a pixel B that corresponds to the pixel A and that is in the current image area. The sum of the distortions of all the pixels of the reconstructed image may be measured by using an SSD or an SAD.

It can be learned from this optional manner that when the image distortion corresponding to the current image area when the current node is not split is the same as the image distortion corresponding to the current image area when a horizontal binary tree split is performed on the current node, it indicates that a binary tree split does not need to be performed on the current node. Therefore, a vertical binary tree split does not need to be performed, thereby improving coding efficiency. When the image distortion corresponding to the current image area when the current node is not split is the same as the image distortion corresponding to the current image area when the vertical binary tree split is performed on the current node, it indicates that the binary tree split does not need to be performed on the current node. Based on this, an unnecessary horizontal binary tree split may be skipped, thereby improving coding efficiency.

Further, because a binary tree split includes a horizontal binary tree split and/or a vertical binary tree split, the binary tree split based coding cost includes a horizontal binary tree split based coding cost and/or a vertical binary tree split based coding cost. To be specific, the binary tree split based coding cost is the horizontal binary tree split based coding cost when only a horizontal binary tree split is performed on the current node. The binary tree split based coding cost is the vertical binary tree split based coding cost when only a vertical binary tree split is performed on the current node. When the horizontal binary tree split and the vertical binary tree split are performed on the current node, the binary tree split based coding cost includes the horizontal binary tree split based coding cost and the vertical binary tree split based coding cost. It should be noted that, that a horizontal binary tree split and a vertical binary tree split are performed on the current node means that the horizontal binary tree split and the vertical binary tree split are separately performed on the current node. In other words, the horizontal binary tree split and the vertical binary tree split are independent.

When a horizontal binary tree split mode is used for the current node, minimum coding costs respectively corresponding to the two nodes obtained through splitting are determined, and then a sum of the minimum coding costs respectively corresponding to the two nodes is obtained, to obtain the horizontal binary tree split based coding cost of the current node. Similarly, when a vertical binary tree split mode is used for the current node, minimum coding costs respectively corresponding to the two nodes obtained through splitting are determined, and then a sum of the minimum coding costs respectively corresponding to the two nodes is obtained, to obtain the vertical binary tree split based coding cost of the current node. A method similar to step S301 may be used to calculate the minimum coding costs corresponding to the nodes. Details are not described in this application again.

Step S303 is described in detail: a triple tree split includes a horizontal triple tree split and/or a vertical triple tree split. Correspondingly, the triple tree split based coding cost includes a horizontal triple tree split based coding cost and/or a vertical triple tree split based coding cost. Step S303 includes the following three optional manners, but is not limited to the three optional manners.

In a first optional manner, if the binary tree split based coding cost includes only a horizontal binary tree split based coding cost generated when a horizontal binary tree split is performed on the current node, the determining of whether a triple tree split based coding cost for coding the current image area when a triple tree split is performed on the current node needs to be obtained includes: if the non-split based coding cost is less than a product of the horizontal binary tree split based coding cost and a first preset threshold, determining that the triple tree split based coding cost does not need to be obtained; or if the non-split based coding cost is less than a product of the horizontal binary tree split based coding cost and a first preset threshold, and a coding tree depth of the current node is less than or equal to a second preset threshold, determining that the triple tree split based coding cost does not need to be obtained.

The first preset threshold and the second preset threshold may be set depending on an actual situation. Optionally, the first preset threshold may be a positive number less than 1.5, for example, 0.92, 0.95, 0.99, 1, or 1.02. The second preset threshold is a positive integer, for example, 1 or 2. For different coding tree depths of the current node, the first preset threshold may vary. For example, when a coding tree depth of the current node is less than or equal to 1, the first preset threshold may be set to 0.95; or when a coding tree depth of the current node is greater than 1, the first preset threshold may be set to 0.92. When the non-split based coding cost is less than the product of the horizontal binary tree split based coding cost and the first preset threshold, a smaller quantity of times for which the current node is split indicates a better coding effect. In this case, the triple tree split based coding cost does not need to be obtained for the current node, in other words, a triple tree split does not need to be performed.

In a second optional manner, if the binary tree split based coding cost includes only a vertical binary tree split based coding cost generated when vertical binary tree split is performed on the current node, the determining of whether a triple tree split based coding cost for coding the current image area when a triple tree split is performed on the current node needs to be obtained includes: if the non-split based coding cost is less than a product of the vertical binary tree split based coding cost and a first preset threshold, determining that the triple tree split based coding cost does not need to be obtained; or if the non-split based coding cost is less than a product of the vertical binary tree split based coding cost and a first preset threshold, and a coding tree depth of the current node is less than or equal to a second preset threshold, determining that the triple tree split based coding cost does not need to be obtained.

The first preset threshold and the second preset threshold herein may be set depending on an actual situation. Optionally, the first preset threshold may be a positive number less than 1.5, for example, 0.92, 0.95, 0.99, 1, or 1.02. The second preset threshold is a positive integer, for example, 1 or 2. For different coding tree depths of the current node, the first preset threshold may vary. For example, when a coding tree depth of the current node is less than or equal to 1, the first preset threshold may be set to 0.95; or when a coding tree depth of the current node is greater than 1, the first preset threshold may be set to 0.92. The first preset threshold herein may be the same as or different from the first preset threshold in the foregoing optional manner. Similarly, the second preset threshold herein may be the same as or different from the second preset threshold in the foregoing optional manner. When the non-split based coding cost is less than the product of the vertical binary tree split based coding cost and the first preset threshold, a smaller quantity of times for which the current node is split indicates a better coding effect. In this case, the triple tree split based coding cost does not need to be obtained for the current node, in other words, a triple tree split does not need to be performed.

In a third optional manner, if the binary tree split based coding cost includes a horizontal binary tree split based coding cost generated when a horizontal binary tree split is performed on the current node and a vertical binary tree split based coding cost generated when a vertical binary tree split is performed on the current node, the determining of whether a triple tree split based coding cost for coding the current image area when triple tree split is performed on the current node needs to be obtained includes: if the non-split based coding cost is less than a product of a minimum value of the horizontal binary tree split based coding cost and the vertical binary tree split based coding cost and a first preset threshold, determining that the triple tree split based coding cost does not need to be obtained; or if the non-split based coding cost is less than a product of a minimum value of the horizontal binary tree split based coding cost and the vertical binary tree split based coding cost and a first preset threshold, and a coding tree depth of the current node is less than or equal to a second preset threshold, determining that the triple tree split based coding cost does not need to be obtained.

The first preset threshold and the second preset threshold herein may be set depending on an actual situation. The first preset threshold herein may be the same as or different from the first preset threshold in the foregoing optional manner. Similarly, the second preset threshold herein may be the same as or different from the second preset threshold in the foregoing optional manner. Optionally, the first preset threshold may be a positive number less than 1.5, for example, 0.92, 0.95, 0.99, 1, or 1.02. The second preset threshold is a positive integer, for example, 1 or 2. For different coding tree depths of the current node, the first preset threshold may vary. For example, when a coding tree depth of the current node is less than or equal to 1, the first preset threshold may be set to 0.95; or when a coding tree depth of the current node is greater than 1, the first preset threshold may be set to 0.92. When the non-split based coding cost is less than the product of the minimum value of the horizontal binary tree split based coding cost and the vertical binary tree split based coding cost and the first preset threshold, a smaller quantity of times for which the current node is split indicates a better coding effect. In this case, the triple tree split based coding cost for coding the current image area when a triple tree split is performed on the current node does not need to be obtained, in other words, a triple tree split does not need to be performed on the current node.

In addition to the foregoing three optional manners, whether the triple tree split based coding cost needs to be obtained may be alternatively determined in the following fourth optional manner.

In some embodiments, whether a prediction mode of a corresponding optimal coding mode used when a horizontal binary tree split or a vertical binary tree split is performed on the current node is a skip mode is determined. If the prediction mode of the corresponding optimal coding mode used when the horizontal binary tree split or the vertical binary tree split is performed on the current node is the skip mode, it indicates that the triple tree split based coding cost for coding the current image area when the triple tree split is performed on the current node does not need to be obtained; or if the prediction mode of the corresponding optimal coding mode used when the horizontal binary tree split or the vertical binary tree split is performed on the current node is not the skip mode, it indicates that the triple tree split based coding cost for coding the current image area when the triple tree split is performed on the current node needs to be obtained. The optimal coding mode used when the horizontal binary tree split is performed on the current node is an optimal coding mode corresponding to the horizontal binary tree split based coding cost, and the optimal coding mode used when the vertical binary tree split is performed on the current node is an optimal coding mode corresponding to the vertical binary tree split based coding cost.

It should be noted that, in this application, a combination manner of the four optional manners in step S303 may alternatively be used to determine whether the triple tree split based coding cost for coding the current image area when a triple tree split is performed on the current node needs to be obtained. For example, with reference to the first optional manner and the second optional manner, if the non-split based coding cost is less than the product of the horizontal binary tree split based coding cost and the first preset threshold, the horizontal triple tree split based coding cost for coding the current image area when the triple tree split is performed on the current node does not to be obtained. Further, if the non-split based coding cost is greater than the product of the vertical binary tree split based coding cost and the first preset threshold, the vertical triple tree split based coding cost for coding the current image area when the triple tree split is performed on the current node needs to be obtained. Alternatively, the fourth optional manner may be combined with any one of the first optional manner, the second optional manner, and the third optional manner of step S303. For example, the fourth optional manner may be first used to determine whether the horizontal triple tree split based coding cost and the vertical triple tree split based coding cost that are for coding the current image area when the triple tree split is performed on the current node need to be obtained. If the horizontal triple tree split based coding cost and the vertical triple tree split based coding cost that are for coding the current image area when the triple tree split is performed on the current node need to be obtained, the foregoing first optional manner is further used to determine whether the horizontal triple tree split based coding cost and the vertical triple tree split based coding cost that are for coding the current image area when the triple tree split is performed on the current node need to be obtained.

Step S304 is described in detail. Optionally, if a triple tree split includes a horizontal triple tree split and a vertical triple tree split, the performing triple tree split on the current node includes: if a width of the current image area is less than a height of the current image area, the horizontal triple tree split is first performed on the current node, and then the vertical triple tree split is performed on the current node; or if a width of the current image area is greater than or equal to a height of the current image area, the vertical triple tree split is first performed on the current node, and then the horizontal triple tree split is performed on the current node. In other words, a split mode in which an image can be split into image areas of more appropriate sizes is first attempted because the image coding effect of the split mode is better. If the split mode is not as good as the non-split mode, another split mode may not be attempted, thereby improving coding efficiency.

Alternatively, if a width of the current image area is less than or equal to a height of the current image area, the horizontal triple tree split is first performed on the current node, and then the vertical triple tree split is performed on the current node; or if a width of the current image area is greater than a height of the current image area, the vertical triple tree split is first performed on the current node, and then performing the horizontal triple tree split is performed on the current node. In other words, a split mode in which an image can be split into image areas of more appropriate sizes is first attempted because an image coding effect of the split mode is better. If the split mode is not as good as the non-split mode, another split mode may not be attempted, thereby improving coding efficiency.

Optionally, if the horizontal triple tree split is first performed on the current node, before performing vertical triple tree split on the current node, the method further includes: determining whether image distortion corresponding to the current image area when the current node is not split is the same as image distortion corresponding to the current image area when the horizontal triple tree split is performed in the current image area; and performing the vertical triple tree split on the current node only when the image distortion corresponding to the current image area when the current node is not split is different from the image distortion corresponding to the current image area when the horizontal triple tree split is performed on the current node.

Alternatively, if the vertical triple tree split is first performed on the current node, before performing horizontal triple tree split on the current node, the method further includes: determining whether image distortion corresponding to the current image area when the current node is not split is the same as image distortion corresponding to the current image area when the vertical triple tree split is performed in the current image area; and performing the horizontal triple tree split on the current node only when the image distortion corresponding to the current image area when the current node is not split is different from the image distortion corresponding to the current image area when the vertical triple tree split is performed on the current node.

It is assumed that a corresponding reconstructed image generated when the current node is not split is a first reconstructed image, and a corresponding reconstructed image generated when the horizontal triple tree split is performed on the current node is a second reconstructed image. The determining of whether image distortion corresponding to the current image area when the current node is not split is the same as image distortion corresponding to the current image area when the horizontal triple tree split is performed on the current node includes: determining whether distortion of each pixel of the first reconstructed image is the same as distortion of a corresponding pixel of the second reconstructed image, or whether a sum of distortion of all pixels of the first reconstructed image is the same as a sum of distortion of all pixels of the second reconstructed image. Both the distortion of the first reconstructed image and the distortion of the second reconstructed image are for the current image area. For example, the distortion of a pixel A of the first reconstructed image may be a pixel difference between the pixel A and a pixel B that corresponds to the pixel A and that is in the current image area. The sum of the distortions of all the pixels of the reconstructed image may be measured by using an SSD or an SAD.

It is assumed that a corresponding reconstructed image generated when the current node is not split is a first reconstructed image, and a corresponding reconstructed image generated when a vertical triple tree split is performed on the current node is a third reconstructed image. The determining of whether image distortion corresponding to the current image area when the current node is not split is the same as image distortion corresponding to the current image area when the vertical triple tree split is performed on the current node includes: determining whether a sum of distortion of all pixels of the first reconstructed image is the same as a sum of distortion of all pixels of the third reconstructed image, or whether distortion of each pixel of the first reconstructed image is the same as distortion of a corresponding pixel of the third reconstructed image. Both the distortion of the first reconstructed image and the distortion of the third reconstructed image are for the current image area. For example, the distortion of a pixel A of the first reconstructed image may be a pixel difference between the pixel A and a pixel B that corresponds to the pixel A and that is in the current image area. The sum of the distortions of all the pixels of the reconstructed image may be measured by using an SSD or an SAD.

In the two optional manners, whether the horizontal triple tree split or vertical triple tree split is skipped may be further determined, thereby improving coding efficiency.

When a horizontal triple tree split mode is used for the current node, minimum coding costs respectively corresponding to three nodes obtained through splitting are determined, and then a sum of the minimum coding costs respectively corresponding to the three nodes is obtained, to obtain the horizontal triple tree split based coding cost of the current node. When a vertical triple tree split mode is used for the current node, minimum coding costs respectively corresponding to the three nodes obtained through splitting are determined, and then a sum of the minimum coding costs respectively corresponding to the three nodes is obtained, to obtain the vertical triple tree split based coding cost of the current node. A method similar to step S301 may be used to calculate the minimum coding costs corresponding to the nodes. Details are not described in this application again.

Optionally, when the horizontal binary tree split based coding cost, the vertical binary tree split based coding cost, the horizontal triple tree split based coding cost, or the vertical triple tree split based coding cost of the current node is calculated, if the current node further has a child node, each coding cost of the current node may be adjusted based on a coding cost of the child node. Similarly, if the child node further has a child node, each coding cost of the parent node of the child node may be adjusted based on the child node. In other words, the foregoing coding cost of the current node may be determined in a recursive manner.

Optionally, after step S304 and before step S305, the method may further include determining whether the current node is split in another manner. For example, the split mode may be quadtree split or another possible split mode. If a specific split mode is not skipped, a coding cost of the current node in the split mode needs to be determined.

Step S305 is described in detail. All the foregoing split modes are split modes that are performed on the current node. If the current node does not skip horizontal binary tree split, vertical binary tree split, horizontal triple tree split, or vertical triple tree split, a minimum coding cost is selected from the non-split based coding cost, the horizontal binary tree split based coding cost, the vertical binary tree split based coding cost, the horizontal triple tree split based coding cost, and the vertical triple tree split based coding cost. If the current node skips at least one split mode, a minimum coding cost is selected from the coding costs corresponding to the remaining split modes.

In conclusion, this application provides the method for determining the coding tree node split mode. In the method, whether the triple tree split based coding cost for coding the current image area when a triple tree split is performed on the current node needs to be obtained may be determined based on the non-split based coding cost and the binary tree split based coding cost. Therefore, in some cases, the encoder side does not need to attempt all split modes, thereby improving coding efficiency. Further, if the image distortion corresponding to the current node when the current node is not split is the same as the image distortion corresponding to the current image area when horizontal binary tree split is performed in the current image area, vertical binary tree split does not need to be performed on the current node; or if the image distortion corresponding to the current image area when the current node is not split is the same as the image distortion corresponding to the current image area when vertical binary tree split is performed in the current image area, horizontal binary tree split does not need to be performed on the current node. Further, if the image distortion corresponding to the current image area when the current node is not split is the same as the image distortion corresponding to the current image area when horizontal triple tree split is performed on the current node, vertical triple tree split does not need to be performed on the current node; or if the image distortion corresponding to the current image area when the current node is not split is the same as the image distortion corresponding to the current image area when vertical triple tree split is performed on the current node, horizontal triple tree split performed on the current node is skipped. Further, coding efficiency can be improved.

Figure 4:
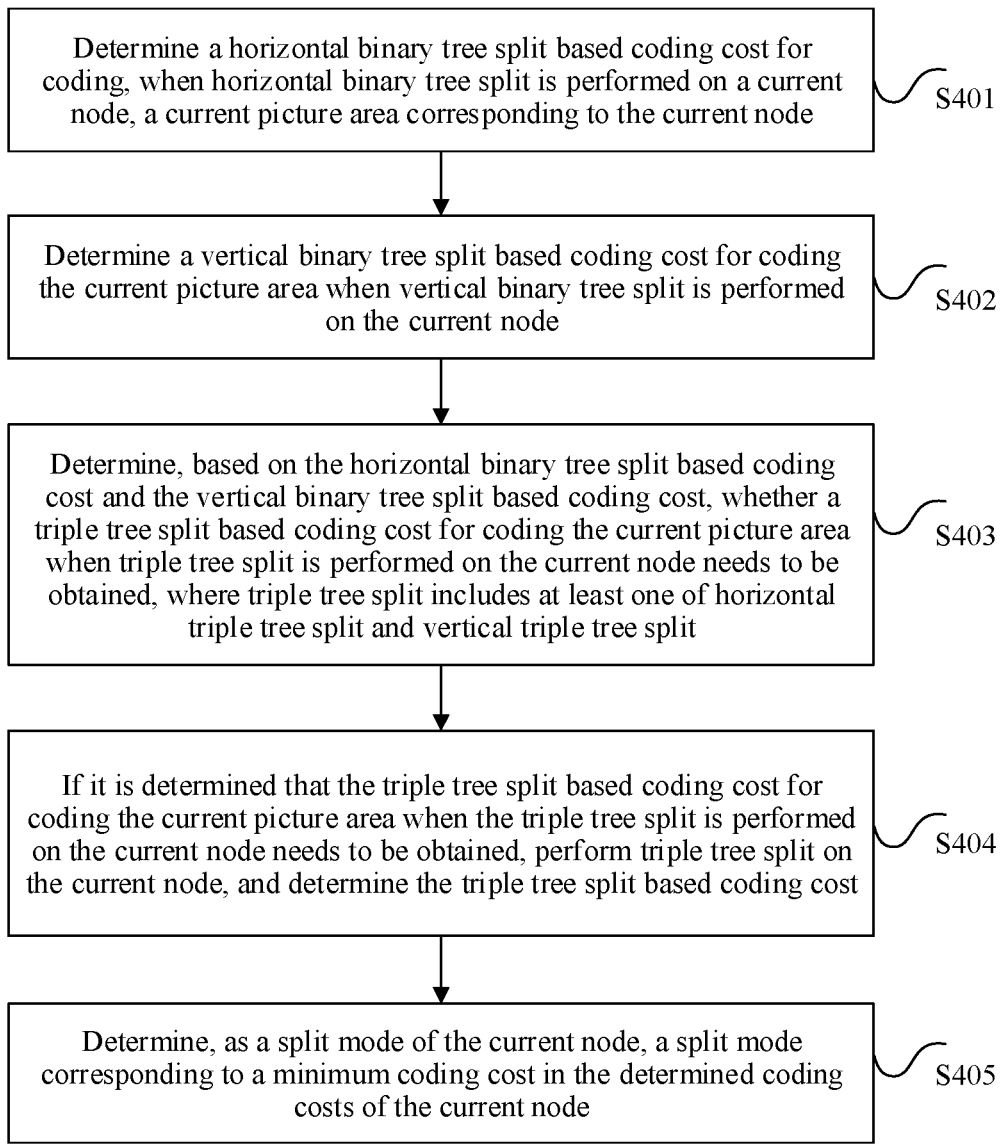
FIG. 4 is a flowchart of a method for determining a coding tree node split mode according to another embodiment of this application.

FIG. 4 is a flowchart of a method for determining a coding tree node split mode according to another embodiment of this application. As shown in FIG. 4, the method includes the following steps:

Step S401: Determine a horizontal binary tree split based coding cost for coding a current image area corresponding to the current node when a horizontal binary tree split is performed on a current node.

Step S402: Determine a vertical binary tree split based coding cost for coding the current image area when a vertical binary tree split is performed on the current node.

Step S403: Determine, based on the horizontal binary tree split based coding cost and the vertical binary tree split based coding cost, whether a triple tree split based coding cost for coding the current image area when a triple tree split is performed on the current node needs to be obtained, and the triple tree split includes at least one of a horizontal triple tree split and a vertical triple tree split.

Step S404: If the triple tree split based coding cost for coding the current image area when triple tree split is performed on the current node needs to be obtained, perform triple tree split on the current node, and determine the triple tree split based coding cost.

Step S405: Determine, as a split mode of the current node, a split mode corresponding to a minimum coding cost in the determined coding costs of the current node.

In step S401, the method for determining the horizontal binary tree split based coding cost for coding the current image area corresponding to the current node when a horizontal binary tree split is performed on the current node in step S401 and the method for determining the vertical binary tree split based coding cost for coding the current image area when vertical binary tree split is performed on the current node in step S402 is the same as the method used in step S302. This is not described herein.

Optionally, if the triple tree split includes a horizontal triple tree split and a vertical triple tree split, step S403 includes: if the horizontal binary tree split based coding cost is greater than a product of the vertical binary tree split based coding cost and a first preset threshold, determining that the horizontal triple tree split based coding cost does not need to be obtained; or if the vertical binary tree split based coding cost is greater than a product of the horizontal binary tree split based coding cost and a second preset threshold, determining that the vertical triple tree split based coding cost does not need to be obtained.

In this optional manner, the first preset threshold is a positive number greater than or equal to 1. For example, the first preset threshold may be 1.125. In this optional manner, when the horizontal binary tree split based coding cost is greater than the product of the vertical binary tree split based coding cost and the first preset threshold, it indicates that the coding efficiency by using the horizontal binary tree split is lower than that by using the vertical binary tree split, and because a split direction of the horizontal triple tree split is the same as that of the horizontal binary tree split, a split direction of the vertical triple tree split is the same as that of the vertical binary tree split. Based on this, it may be inferred that the coding efficiency by using the horizontal triple tree split is lower than the coding efficiency by using the vertical triple tree split. Therefore, the horizontal triple tree split based coding cost does not need to be obtained. Similarly, when the vertical binary tree split based coding cost is greater than the product of the horizontal binary tree split based coding cost and the second preset threshold, it indicates that coding efficiency by using the horizontal binary tree split is higher than that by using the vertical binary tree split, and because a split direction of the horizontal triple tree split is the same as that of the horizontal binary tree split, a split direction of the vertical triple tree split is the same as that of the vertical binary tree split. Based on this, it may be inferred that the coding efficiency by using the horizontal triple tree split is higher than the coding efficiency by using the vertical triple tree split. Therefore, the vertical triple tree split based coding cost does not need to be obtained.

Optionally, if the triple tree split includes horizontal triple tree split and vertical triple tree split, step S403 includes: if the horizontal binary tree split based coding cost is greater than a product of the vertical binary tree split based coding cost and a first preset threshold, and a coding tree depth of the current node is less than a second preset threshold, determining that the horizontal triple tree split based coding cost does not need to be obtained; or if the vertical binary tree split based coding cost is greater than a product of the horizontal binary tree split based coding cost and a third preset threshold, and a coding tree depth of the current node is less than a fourth preset threshold, determining that the horizontal triple tree split based coding cost does not need to be obtained.

It should be noted that all preset thresholds in this application are greater than 0.

Step S404 is the same as step S303, and step S405 is the same as step S304. Corresponding content and effects are not described herein again.

In conclusion, this application provides the method for determining the coding tree node split mode. In the method, whether the horizontal triple tree split based coding cost needs to be obtained may be determined based on the horizontal binary tree split based coding cost and the vertical binary tree split based coding cost. Therefore, in some cases, the encoder side does not need to attempt all split modes, thereby improving coding efficiency.

Figure 5:
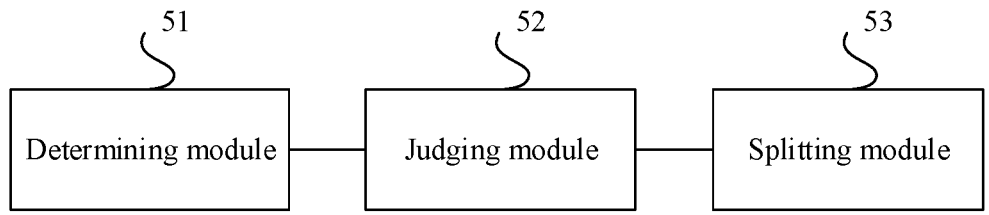
FIG. 5 is a schematic structural diagram of an apparatus for determining a coding tree node split mode according to an embodiment of this application.

FIG. 5 is a schematic structural diagram of an apparatus for determining a coding tree node split mode according to an embodiment of this application. As shown in FIG. 5, the apparatus includes a determining module 51, a judging module 52, and a splitting module 53.

The determining module 51 is configured to determine a non-split based coding cost for coding, when a current node is not split, a current image area corresponding to the current node.

The splitting module 53 is configured to perform binary tree splits on the current node.

The determining module 51 is further configured to determine a binary tree split based coding cost for coding the current image area when a binary tree split is performed on the current node.

The judging module 52 is configured to determine, based on the non-split based coding cost and the binary tree split based coding cost, whether a triple tree split based coding cost for coding the current image area when a triple tree split is performed on the current node needs to be obtained.

The splitting module 53 is further configured to, if the judging module 52 determines that the triple tree split based coding cost for coding the current image area when triple tree split is performed on the current node needs to be obtained 53, perform a triple tree split on the current node.

The determining module 51 is further configured to determine the triple tree split based coding cost, and determine, as a split mode of the current node, a split mode corresponding to a minimum coding cost in the determined coding costs of the current node.

Optionally, if the binary tree split based coding cost includes only a horizontal binary tree split based coding cost generated when a horizontal binary tree split is performed on the current node, the judging module 52 is specifically configured to:

if the non-split based coding cost is less than a product of the horizontal binary tree split based coding cost and a first preset threshold, determine that the triple tree split based coding cost does not need to be obtained; or if the non-split based coding cost is less than a product of the horizontal binary tree split based coding cost and a first preset threshold, and a coding tree depth of the current node is less than or equal to a second preset threshold, determine that the triple tree split based coding cost does not need to be obtained.

If the binary tree split based coding cost includes only a vertical binary tree split based coding cost generated when a vertical binary tree split is performed on the current node, the judging module 52 is specifically configured to: if the non-split based coding cost is less than a product of the vertical binary tree split based coding cost and a first preset threshold, determine that the triple tree split based coding cost does not need to be obtained; or if the non-split based coding cost is less than a product of the vertical binary tree split based coding cost and a first preset threshold, and a coding tree depth of the current node is less than or equal to a second preset threshold, determine that the triple tree split based coding cost does not need to be obtained.

If the binary tree split based coding cost includes a horizontal binary tree split based coding cost generated when a horizontal binary tree split is performed on the current node and a vertical binary tree split based coding cost generated when a vertical binary tree split is performed on the current node, the judging module 52 is specifically configured to: if the non-split based coding cost is less than a product of a minimum value of the horizontal binary tree split based coding cost and the vertical binary tree split based coding cost and a first preset threshold, determine that the triple tree split based coding cost does not need to be obtained; or if the non-split based coding cost is less than a product of a minimum value of the horizontal binary tree split based coding cost and the vertical binary tree split based coding cost and a first preset threshold, and a coding tree depth of the current node is less than or equal to a second preset threshold, determine that the triple tree split based coding cost does not need to be obtained.

If the triple tree split includes horizontal triple tree split and vertical triple tree split, the splitting module 53 is specifically configured to:

if a width of the current image area is less than a height of the current image area, first perform a horizontal triple tree split on the current node, and then perform a vertical triple tree split on the current node; or if a width of the current image area is greater than or equal to a height of the current image area, first perform a vertical triple tree split on the current node, and then perform a horizontal triple tree split on the current node; or if a width of the current image area is less than or equal to a height of the current image area, first performing a horizontal triple tree split on the current node, and then performing a vertical triple tree split on the current node; or if a width of the current image area is greater than a height of the current image area, first performing a vertical triple tree split on the current node, and then performing a horizontal triple tree split on the current node.

Optionally, the judging module 52 is further configured to: if horizontal triple tree split is first performed on the current node, before a horizontal triple tree split is performed on the current node, determine whether the image distortion corresponding to the current image area when the current node is not split is the same as the image distortion corresponding to the current image area when the horizontal triple tree split is performed in the current image area.

The splitting module 53 is further configured to perform a vertical triple tree split on the current node only when the image distortion corresponding to the current image area when the current node is not split is different from the image distortion corresponding to the current image area when the horizontal triple tree split is performed on the current node.

Alternatively, the judging module 52 is further configured to: if a vertical triple tree split is first performed on the current node, before the horizontal triple tree split is performed on the current node, determine whether the image distortion corresponding to the current image area when the current node is not split is the same as the image distortion corresponding to the current image area when the vertical triple tree split is performed in the current image area.

Alternatively, the splitting module 53 is further configured to perform the horizontal triple tree split on the current node only when the image distortion corresponding to the current image area when the current node is not split is different from the image distortion corresponding to the current image area when vertical triple tree split is performed on the current node.

Optionally, if a binary tree split includes a horizontal binary tree split and a vertical binary tree split, the splitting module 53 is specifically configured to:

if the width of the current image area is less than the height of the current image area, first perform the horizontal binary tree split on the current node, and then perform the vertical binary tree split on the current node; or if the width of the current image area is greater than or equal to the height of the current image area, first perform the vertical binary tree split on the current node, and then perform the horizontal binary tree split on the current node; or if the width of the current image area is less than or equal to the height of the current image area, first performing the horizontal binary tree split on the current node, and then performing the vertical binary tree split on the current node; or if the width of the current image area is greater than the height of the current image area, first performing the vertical binary tree split on the current node, and then performing the horizontal binary tree split on the current node.

Optionally, the judging module 52 is further configured to: if a horizontal binary tree split is first performed on the current node, before a vertical binary tree split is performed on the current node, determine whether the image distortion corresponding to the current image area when the current node is not split is the same as the image distortion corresponding to the current image area when a horizontal binary tree split is performed in the current image area.

The splitting module 53 is further configured to perform a vertical binary tree split on the current node only when the image distortion corresponding to the current image area when the current node is not split is different from the image distortion corresponding to the current image area when a horizontal binary tree split is performed on the current node.

Alternatively, the judging module 52 is further configured to: if a vertical binary tree split is first performed on the current node, before a horizontal binary tree split is performed on the current node, determine whether the image distortion corresponding to the current image area when the current node is not split is the same as the image distortion corresponding to the current image area when a vertical binary tree split is performed in the current image area.

Alternatively, the splitting module 53 is further configured to perform a horizontal binary tree split on the current node only when the image distortion corresponding to the current image area when the current node is not split is different from the image distortion corresponding to the current image area when a vertical binary tree split is performed on the current node.

The apparatus for determining the coding tree node split mode provided in this application may perform the foregoing method for determining the coding tree node split mode corresponding to FIG. 3 and the optional manner of the method. Implementation principles and technical effects thereof are similar. Details are not described herein again.

Figure 6:
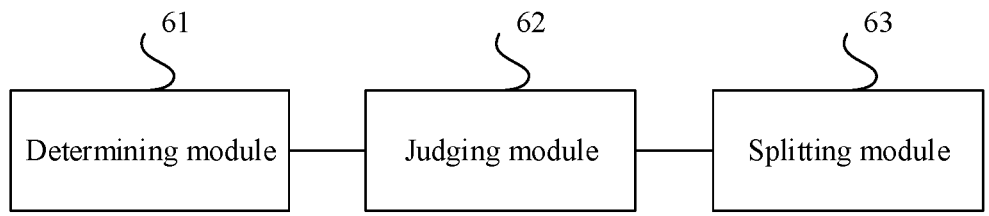
FIG. 6 is a schematic structural diagram of an apparatus for determining a coding tree node split mode according to another embodiment of this application.

FIG. 6 is a schematic structural diagram of an apparatus for determining a coding tree node split mode according to another embodiment of this application. As shown in FIG. 6, the apparatus includes a determining module 61, a judging module 62, and a splitting module 63.

The determining module 61 is configured to determine a horizontal binary tree split based coding cost for coding a current image area corresponding to the current node when a horizontal binary tree split is performed on a current node.

The determining module 61 is further configured to determine a vertical binary tree split based coding cost for coding the current image area when a vertical binary tree split is performed on the current node.

The judging module 62 is configured to determine, based on the horizontal binary tree split based coding cost and the vertical binary tree split based coding cost, whether a triple tree split based coding cost for coding the current image area when a triple tree split is performed on the current node needs to be obtained, and the triple tree split includes at least one of horizontal triple tree split and vertical triple tree split.

The splitting module 63 is configured to: if the judging module 62 determines that the triple tree split based coding cost for coding the current image area when a triple tree split is performed on the current node needs to be obtained, perform the triple tree split on the current node.

The determining module 61 is further configured to determine the triple tree split based coding cost, and determine, as a split mode of the current node, a split mode corresponding to a minimum coding cost in the determined coding costs of the current node.

Optionally, if the triple tree split includes a horizontal triple tree split and a vertical triple tree split, the judging module 62 is configured to: if the horizontal binary tree split based coding cost is greater than a product of the vertical binary tree split based coding cost and a first preset threshold, determine that the horizontal triple tree split based coding cost does not need to be obtained; or if the vertical binary tree split based coding cost is greater than a product of the horizontal binary tree split based coding cost and a second preset threshold, determine that the vertical triple tree split based coding cost does not need to be obtained.

The apparatus for determining the coding tree node split mode provided in this application may perform the foregoing method for determining the coding tree node split mode corresponding to FIG. 4 and the optional manner of the method. Implementation principles and technical effects thereof are similar. Details are not described herein again.

Figure 7:
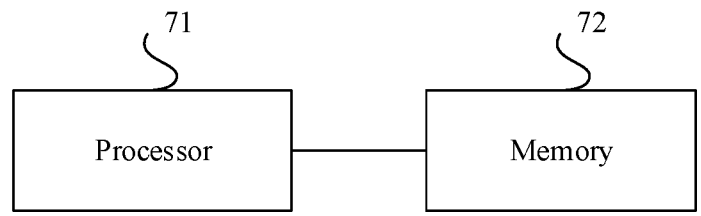
FIG. 7 is a schematic structural diagram of a coding device according to an embodiment of this application.

FIG. 7 is a schematic structural diagram of a coding device according to an embodiment of this application. As shown in FIG. 7, the device includes a processor 71 and a memory 72.

The memory 72 is configured to store an execution instruction of the processor 71.

The processor 71 is configured to: determine a non-split based coding cost for coding, when a current node is not split, a current image area corresponding to the current node; perform a binary tree split on the current node; and determine a binary tree split based coding cost for coding the current image area when the binary tree split is performed on the current node; determine, based on the non-split based coding cost and the binary tree split based coding cost, whether a triple tree split based coding cost for coding the current image area when a triple tree split is performed on the current node needs to be obtained; if the triple tree split based coding cost for coding the current image area when the triple tree split is performed on the current node needs to be obtained, perform the triple tree split on the current node; and determine the triple tree split based coding cost, and determine, as a split mode of the current node, a split mode corresponding to a minimum coding cost in the determined coding costs of the current node.

Optionally, if the binary tree split based coding cost includes only a horizontal binary tree split based coding cost generated when a horizontal binary tree split is performed on the current node, the processor 71 is specifically configured to:

if the non-split based coding cost is less than a product of the horizontal binary tree split based coding cost and a first preset threshold, determine that the triple tree split based coding cost does not need to be obtained; or if the non-split based coding cost is less than a product of the horizontal binary tree split based coding cost and a first preset threshold, and a coding tree depth of the current node is less than or equal to a second preset threshold, determine that the triple tree split based coding cost does not need to be obtained;

If the binary tree split based coding cost includes only a vertical binary tree split based coding cost generated when a vertical binary tree split is performed on the current node, the processor 71 is specifically configured to: if the non-split based coding cost is less than a product of the vertical binary tree split based coding cost and a first preset threshold, determine that the triple tree split based coding cost does not need to be obtained; or if the non-split based coding cost is less than a product of the vertical binary tree split based coding cost and a first preset threshold, and a coding tree depth of the current node is less than or equal to a second preset threshold, determine that the triple tree split based coding cost does not need to be obtained.

If the binary tree split based coding cost includes a horizontal binary tree split based coding cost generated when a horizontal binary tree split is performed on the current node and a vertical binary tree split based coding cost generated when a vertical binary tree split is performed on the current node, the processor 71 is specifically configured to: if the non-split based coding cost is less than a product of a minimum value of the horizontal binary tree split based coding cost and the vertical binary tree split based coding cost and a first preset threshold, determine that the triple tree split based coding cost does not need to be obtained; or if the non-split based coding cost is less than a product of a minimum value of the horizontal binary tree split based coding cost and the vertical binary tree split based coding cost and a first preset threshold, and a coding tree depth of the current node is less than or equal to a second preset threshold, determine that the triple tree split based coding cost does not need to be obtained.

Optionally, if the triple tree split includes a horizontal triple tree split and a vertical triple tree split, the processor 71 is specifically configured to:

if a width of the current image area is less than a height of the current image area, first perform a horizontal triple tree split on the current node, and then perform a vertical triple tree split on the current node; or if a width of the current image area is greater than or equal to a height of the current image area, first perform a vertical triple tree split on the current node, and then perform a horizontal triple tree split on the current node; or if a width of the current image area is less than or equal to a height of the current image area, first performing a horizontal triple tree split on the current node, and then performing a vertical triple tree split on the current node; or if a width of the current image area is greater than a height of the current image area, first performing a vertical triple tree split on the current node, and then performing a horizontal triple tree split on the current node.

Optionally, the processor 71 is further configured to: if a horizontal triple tree split is first performed on the current node, before a vertical triple tree split is performed on the current node, determine whether the image distortion corresponding to the current image area when the current node is not split is the same as the image distortion corresponding to the current image area when the horizontal triple tree split is performed in the current image area.

The processor 71 is further configured to perform a vertical triple tree split on the current node only when the image distortion corresponding to the current image area when the current node is not split is different from the image distortion corresponding to the current image area when a horizontal triple tree split is performed on the current node.

Alternatively, the processor 71 is further configured to: if a vertical triple tree split is first performed on the current node, before a horizontal triple tree split is performed on the current node, determine whether the image distortion corresponding to the current image area when the current node is not split is the same as the image distortion corresponding to the current image area when the vertical triple tree split is performed in the current image area.

Alternatively, the processor 71 is further configured to perform a horizontal triple tree split on the current node only when the image distortion corresponding to the current image area when the current node is not split is different from the image distortion corresponding to the current image area when a vertical triple tree split is performed on the current node.

Optionally, if a binary tree split includes a horizontal binary tree split and a vertical binary tree split, the processor 71 is specifically configured to:

if the width of the current image area is less than the height of the current image area, first perform a horizontal binary tree split on the current node, and then perform a vertical binary tree split on the current node; or if the width of the current image area is greater than or equal to the height of the current image area, first perform the vertical binary tree split on the current node, and then perform the horizontal binary tree split on the current node; or if the width of the current image area is less than or equal to the height of the current image area, first performing a horizontal binary tree split on the current node, and then performing a vertical binary tree split on the current node; or if the width of the current image area is greater than the height of the current image area, first performing the vertical binary tree split on the current node, and then performing the horizontal binary tree split on the current node.

Optionally, the processor 71 is further configured to: if a horizontal binary tree split is first performed on the current node, before a vertical binary tree split is performed on the current node, determine whether the image distortion corresponding to the current image area when the current node is not split is the same as the image distortion corresponding to the current image area when the horizontal binary tree split is performed in the current image area.

The processor 71 is further configured to perform a vertical binary tree split on the current node only when the image distortion corresponding to the current image area when the current node is not split is different from the image distortion corresponding to the current image area when a horizontal binary tree split is performed on the current node.

Alternatively, the processor 71 is further configured to: if a vertical binary tree split is first performed on the current node, before a horizontal binary tree split is performed on the current node, determine whether the image distortion corresponding to the current image area when the current node is not split is the same as the image distortion corresponding to the current image area when the vertical binary tree split is performed in the current image area.

Alternatively, the processor 71 is further configured to perform a horizontal binary tree split on the current node only when the image distortion corresponding to the current image area when the current node is not split is different from the image distortion corresponding to the current image area when a vertical binary tree split is performed on the current node.

The coding device provided in this application may perform the foregoing method for determining the coding tree node split mode corresponding to FIG. 3 and the optional manner of the method. Implementation principles and technical effects thereof are similar. Details are not described herein again.

Figure 8:
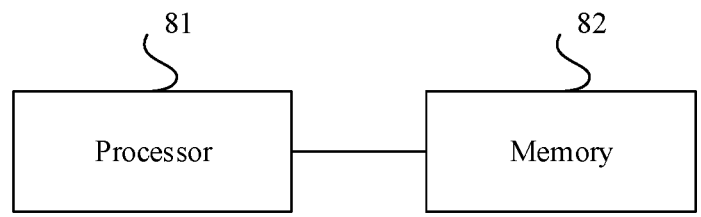
FIG. 8 is a schematic structural diagram of a coding device according to another embodiment of this application.

FIG. 8 is a schematic structural diagram of a coding device according to another embodiment of this application. As shown in FIG. 8, the device includes a processor 81 and a memory 82.

The memory 82 is configured to store an execution instruction of the processor 81.

The processor 81 is further configured to: determine a horizontal binary tree split based coding cost for coding, when horizontal binary tree split is performed on a current node, a current image area corresponding to the current node; determine a vertical binary tree split based coding cost for coding the current image area when a vertical binary tree split is performed on the current node; determine, based on the horizontal binary tree split based coding cost and the vertical binary tree split based coding cost, whether a triple tree split based coding cost for coding the current image area when triple tree split is performed on the current node needs to be obtained, and the triple tree split includes at least one of a horizontal triple tree split and a vertical triple tree split; if the triple tree split based coding cost for coding the current image area when the triple tree split is performed on the current node needs to be obtained, perform the triple tree split on the current node; and determine the triple tree split based coding cost, and determine, as a split mode of the current node, a split mode corresponding to a minimum coding cost in the determined coding costs of the current node.

Optionally, if the triple tree split includes a horizontal triple tree split and a vertical triple tree split, the processor 81 is specifically configured to: if the horizontal binary tree split based coding cost is greater than a product of the vertical binary tree split based coding cost and a first preset threshold, determine that the horizontal triple tree split based coding cost does not need to be obtained; or if the vertical binary tree split based coding cost is greater than a product of the horizontal binary tree split based coding cost and a second preset threshold, determine that the vertical triple tree split based coding cost does not need to be obtained.

The coding device provided in this application may perform the foregoing method for determining the coding tree node split mode corresponding to FIG. 4 and the optional manner of the method. Implementation principles and technical effects thereof are similar. Details are not described herein again.

What is claimed is:

1. A method for determining a coding tree node split mode, comprising:
    determining a non-split based coding cost for coding a current image area corresponding to the current node when a current node is not split;
    performing binary tree split on the current node;
    determining a binary tree split based coding cost for coding the current image area when a binary tree split is performed on the current node;
    determining, based on the non-split based coding cost and the binary tree split based coding cost, whether a triple tree split based coding cost for coding the current image area needs to be obtained, wherein the triple tree split based coding cost corresponds to a triple tree split performed on the current node;
    performing the triple tree split on the current node when the triple tree split based coding cost for coding the current image area needs to be obtained;
    determining the triple tree split based coding cost; and
    determining a split mode of the current node according to the non-split based coding cost, the binary tree split based coding cost and the triple tree split based coding cost, wherein the split mode corresponding to a minimum coding cost of the non-split based coding cost, the binary tree split based coding cost and the triple tree split based coding cost.

2. The method according to claim 1, wherein when the binary tree split based coding cost only comprises a horizontal binary tree split based coding cost, wherein the horizontal binary tree split based coding cost is generated when a horizontal binary tree split is performed on the current node, the determining of whether the triple tree split based coding cost for coding the current image area needs to be obtained comprises:
    determining that the triple tree split based coding cost does not need to be obtained when the non-split based coding cost is less than a product of the horizontal binary tree split based coding cost and a first preset threshold; or
    determining that the triple tree split based coding cost does not need to be obtained when a coding tree depth of the current node is less than or equal to a second preset threshold, and the non-split based coding cost is less than a product of the horizontal binary tree split based coding cost and a first preset threshold;
    when the binary tree split based coding cost only comprises a vertical binary tree split based coding cost, wherein the vertical binary tree split based coding cost is generated when a vertical binary tree split is performed on the current node, the determining whether the triple tree split based coding cost for coding the current image area needs to be obtained comprises:
    determining that the triple tree split based coding cost does not need to be obtained when the non-split based coding cost is less than a product of the vertical binary tree split based coding cost and a first preset threshold; or
    determining that the triple tree split based coding cost does not need to be obtained when a coding tree depth of the current node is less than or equal to a second preset threshold, and the non-split based coding cost is less than a product of the vertical binary tree split based coding cost and a first preset threshold;

when the binary tree split based coding cost comprises a horizontal binary tree split based coding cost and a vertical binary tree split based coding cost, wherein the horizontal binary tree split based coding cost is generated when horizontal binary tree split is performed on the current node and the vertical binary tree split based coding cost is generated when vertical binary tree split is performed on the current node, the determining of whether the triple tree split based coding cost for coding the current image area needs to be obtained comprises:

determining that the triple tree split based coding cost does not need to be obtained when the non-split based coding cost is less than a product of a first preset threshold and a minimum value of the horizontal binary tree split based coding cost and the vertical binary tree split based coding cost; or determining that the triple tree split based coding cost does not need to be obtained when a coding tree depth of the current node is less than or equal to a second preset threshold, and the non-split based coding cost is less than a product of a first preset threshold and a minimum value of the horizontal binary tree split based coding cost and the vertical binary tree split based coding cost.

3. The method according to claim 1, wherein the triple tree split comprises a horizontal triple tree split and a vertical triple tree split, the performing triple tree split on the current node comprises:

when a width of the current image area is less than a height of the current image area, first performing the horizontal triple tree split on the current node, and then performing the vertical triple tree split on the current node;

when a width of the current image area is greater than or equal to a height of the current image area, first performing the vertical triple tree split on the current node, and then performing the horizontal triple tree split on the current node;

when a width of the current image area is less than or equal to a height of the current image area, first performing the horizontal triple tree split on the current node, and then performing the vertical triple tree split on the current node; or when a width of the current image area is greater than a height of the current image area, first performing the vertical triple tree split on the current node, and then performing the horizontal triple tree split on the current node.

4. The method according to claim 3, wherein when the horizontal triple tree split is first performed on the current node, before performing the vertical triple tree split on the current node, the method further comprises:

determining whether image distortion corresponding to the current image area when the current node is not split is the same as image distortion corresponding to the current image area when the horizontal triple tree split is performed on the current node; and performing vertical triple tree split on the current node only when the image distortion corresponding to the current image area when the current node is not split is different from the image distortion corresponding to the current image area when the horizontal triple tree split is performed on the current node; or when the vertical triple tree split is first performed on the current node, before performing the horizontal triple tree split on the current node, the method further comprises:

determining whether image distortion corresponding to the current image area when the current node is not split is the same as image distortion corresponding to the current image area when the vertical triple tree split is performed on the current node;

and performing the horizontal triple tree split on the current node only when the image distortion corresponding to the current image area when the current node is not split is different from the image distortion corresponding to the current image area when the vertical triple tree split is performed on the current node.

5. The method according to claim 1, wherein the binary tree split comprises a horizontal binary tree split and a vertical binary tree split, the performing of the binary tree split on the current node comprises:

when the width of the current image area is less than the height of the current image area, first performing the horizontal binary tree split on the current node, and then performing the vertical binary tree split on the current node;

when the width of the current image area is greater than or equal to the height of the current image area, first performing the vertical binary tree split on the current node, and then performing the horizontal binary tree split on the current node;

when the width of the current image area is less than or equal to the height of the current image area, first performing the horizontal binary tree split on the current node, and then performing the vertical binary tree split on the current node; or when the width of the current image area is greater than the height of the current image area, first performing the vertical binary tree split on the current node, and then performing the horizontal binary tree split on the current node.

6. The method according to claim 5, wherein when the horizontal binary tree split is first performed on the current node, before performing the vertical binary tree split on the current node, the method further comprises:

determining whether the image distortion corresponding to the current image area when the current node is not split is the same as the image distortion corresponding to the current image area when the horizontal binary tree split is performed on the current node; and performing the vertical binary tree split on the current node only when the image distortion corresponding to the current image area when the current node is not split is different from the image distortion corresponding to the current image area when horizontal binary tree split is performed on the current node; or when the vertical binary tree split is first performed on the current node, before performing the horizontal binary tree split on the current node, the method further comprises:

determining whether the image distortion corresponding to the current image area when the current node is not split is the same as the image distortion corresponding to the current image area when the vertical binary tree split is performed on the current node; and performing the horizontal binary tree split on the current node only when the image distortion corresponding to the current image area when the current node is not split is different from the image distortion corresponding to the current image area when the vertical binary tree split is performed on the current node.

7. A method for determining a coding tree node split mode, comprising:
- determining a horizontal binary tree split based coding cost for coding, when a horizontal binary tree split is performed on a current node, a current image area corresponding to the current node; and
- determining a vertical binary tree split based coding cost for coding the current image area when a vertical binary tree split is performed on the current node;
- determining, based on the horizontal binary tree split based coding cost and the vertical binary tree split based coding cost, whether a triple tree split based coding cost for coding the current image area needs to be obtained, wherein the triple tree split based coding cost corresponds to triple tree split is performed on the current node, and the triple tree split comprises at least one of the horizontal triple tree split and the vertical triple tree split; and
- when the triple tree split based coding cost for coding the current image area needs to be obtained, performing the triple tree split on the current node;
- determining the triple tree split based coding cost; and
- determining a split mode of the current node according to the horizontal binary tree split based coding cost, the vertical binary tree split based coding cost and the triple tree split based coding cost, wherein the split mode corresponding to a minimum coding cost of the horizontal binary tree split based coding cost, the vertical binary tree split based coding cost and the triple tree split based coding cost.

8. The method according to claim 7, wherein the triple tree split comprises a horizontal triple tree split and a vertical triple tree split, the determining whether a triple tree split based coding cost for coding the current image area needs to be obtained comprises:
- determining that the horizontal triple tree split based coding cost does not need to be obtained when the horizontal binary tree split based coding cost is greater than a product of the vertical binary tree split based coding cost and a first preset threshold; or
- determining that the vertical triple tree split based coding cost does not need to be obtained when the vertical binary tree split based coding cost is greater than a product of the horizontal binary tree split based coding cost and a second preset threshold.

9. An apparatus for determining a coding tree node split mode, comprising:
- at least one processor; and
- a memory storing computer executable instructions for execution by the at least one processor, wherein the computer executable instructions instruct the at least one processor to perform the steps of:
- determining a non-split based coding cost for coding, when a current node is not split, a current image area corresponding to the current node;
- performing a binary tree split on the current node;
- determining a binary tree split based coding cost for coding the current image area when the binary tree split is performed on the current node;
- determining, based on the non-split based coding cost and the binary tree split based coding cost, whether a triple tree split based coding cost for coding the current image area needs to be obtained, wherein the triple tree split based coding cost corresponds to the triple tree split performed on the current node;
- performing the triple tree split on the current node when the triple tree split based coding cost for coding the current image area needs to be obtained;
- determining the triple tree split based coding cost; and
- determining a split mode of the current node according to the non-split based coding cost, the binary tree split based coding cost and the triple tree split based coding cost, wherein the split mode corresponds to a minimum coding cost of the non-split based coding cost, the binary tree split based coding cost and the triple tree split based coding cost.

10. The apparatus according to claim 9, wherein when the binary tree split based coding cost only comprises a horizontal binary tree split based coding cost, and the horizontal binary tree split based coding cost is generated when the horizontal binary tree split is performed on the current node; wherein the computer executable instructions further instruct the at least one processor to perform the steps of:
- determining that the triple tree split based coding cost does not need to be obtained when the non-split based coding cost is less than a product of the horizontal binary tree split based coding cost and a first preset threshold; or
- determining that the triple tree split based coding cost does not need to be obtained when a coding tree depth of the current node is less than or equal to a second preset threshold, and the non-split based coding cost is less than a product of the horizontal binary tree split based coding cost and a first preset threshold;
- when the binary tree split based coding cost only comprises a vertical binary tree split based coding cost, and the vertical binary tree split based coding cost is generated when a vertical binary tree split is performed on the current node; wherein the computer executable instructions further instruct the at least one processor to perform the steps of:
- determining that the triple tree split based coding cost does not need to be obtained when the non-split based coding cost is less than a product of the vertical binary tree split based coding cost and a first preset threshold; or
- determining that the triple tree split based coding cost does not need to be obtained when a coding tree depth of the current node is less than or equal to a second preset threshold, and the non-split based coding cost is less than a product of the vertical binary tree split based coding cost and a first preset threshold;
- when the binary tree split based coding cost comprises a horizontal binary tree split based coding cost and a vertical binary tree split based coding cost, the horizontal binary tree split based coding cost is generated when horizontal binary tree split is performed on the current node and the vertical binary tree split based coding cost is generated when the vertical binary tree split is performed on the current node; wherein the computer executable instructions further instruct the at least one processor to perform the steps of:
- determining that the triple tree split based coding cost does not need to be obtained when the non-split based coding cost is less than a product of a first preset threshold and a minimum value of the horizontal binary tree split based coding cost and the vertical binary tree split based coding cost and; or
- determining that the triple tree split based coding cost does not need to be obtained when a coding tree depth of the current node is less than or equal to a second preset threshold, and the non-split based coding cost is less than a product of a first preset threshold and a minimum value of the horizontal binary tree split based coding cost and the vertical binary tree split based coding cost.

11. The apparatus according to claim 9, wherein the triple tree split comprises a horizontal triple tree split and a vertical triple tree split, the computer executable instructions further instruct the at least one processor to perform the steps of:

when a width of the current image area is less than a height of the current image area, first performing the horizontal triple tree split on the current node, and then performing the vertical triple tree split on the current node;

when a width of the current image area is greater than or equal to a height of the current image area, first performing the vertical triple tree split on the current node, and then performing the horizontal triple tree split on the current node;

when a width of the current image area is less than or equal to a height of the current image area, first performing the horizontal triple tree split on the current node, and then performing the vertical triple tree split on the current node; or when a width of the current image area is greater than a height of the current image area, first performing the vertical triple tree split on the current node, and then performing the horizontal triple tree split on the current node.

12. The apparatus according to claim 11, wherein when the horizontal triple tree split is first performed on the current node, before performing the vertical triple tree split on the current node, the computer executable instructions further instruct the at least one processor to perform the steps of:

determining whether image distortion corresponding to the current image area when the current node is not split is the same as image distortion corresponding to the current image area when the horizontal triple tree split is performed on the current node; and performing the vertical triple tree split on the current node only when the image distortion corresponding to the current image area when the current node is not split is different from the image distortion corresponding to the current image area when horizontal triple tree split is performed on the current node; or when the vertical triple tree split is first performed on the current node, before performing the horizontal triple tree split on the current node, the computer executable instructions further instruct the at least one processor to perform the steps of:

determining whether image distortion corresponding to the current image area when the current node is not split is the same as image distortion corresponding to the current image area when the vertical triple tree split is performed on the current node;

and performing the horizontal triple tree split on the current node only when the image distortion corresponding to the current image area when the current node is not split is different from the image distortion corresponding to the current image area when the vertical triple tree split is performed on the current node.

13. The apparatus according to claim 9, wherein the binary tree split comprises a horizontal binary tree split and a vertical binary tree split, the computer executable instructions further instruct the at least one processor to perform the steps of:

when the width of the current image area is less than the height of the current image area, first performing the horizontal binary tree split on the current node, and then performing the vertical binary tree split on the current node;

when the width of the current image area is greater than or equal to the height of the current image area, first performing the vertical binary tree split on the current node, and then performing the horizontal binary tree split on the current node;

when the width of the current image area is less than or equal to the height of the current image area, first performing the horizontal binary tree split on the current node, and then performing the vertical binary tree split on the current node; or when the width of the current image area is greater than the height of the current image area, first performing the vertical binary tree split on the current node, and then performing the horizontal binary tree split on the current node.

14. The apparatus according to claim 13, wherein when the horizontal binary tree split is first performed on the current node, before performing the vertical binary tree split on the current node, the computer executable instructions further instruct the at least one processor to perform the steps of:

determining whether the image distortion corresponding to the current image area when the current node is not split is the same as the image distortion corresponding to the current image area when the horizontal binary tree split is performed on the current node; and performing the vertical binary tree split on the current node only when the image distortion corresponding to the current image area when the current node is not split is different from the image distortion corresponding to the current image area when horizontal binary tree split is performed on the current node; or when the vertical binary tree split is first performed on the current node, before performing the horizontal binary tree split on the current node, the computer executable instructions further instruct the at least one processor to perform the steps of:

determining whether the image distortion corresponding to the current image area when the current node is not split is the same as the image distortion corresponding to the current image area when the vertical binary tree split is performed on the current node; and performing the horizontal binary tree split on the current node only when the image distortion corresponding to the current image area when the current node is not split is different from the image distortion corresponding to the current image area when the vertical binary tree split is performed on the current node.

15. An apparatus for determining a coding tree node split mode, comprising:

at least one processor; and a memory storing computer executable instructions for execution by the at least one processor, wherein the computer executable instructions instruct the at least one processor to perform the steps of:

determining a horizontal binary tree split based coding cost for coding, when a horizontal binary tree split is performed on a current node, a current image area corresponding to the current node; and determining a vertical binary tree split based coding cost for coding the current image area when a vertical binary tree split is performed on the current node;

determining, based on the horizontal binary tree split based coding cost and the vertical binary tree split based coding cost, whether a triple tree split based coding cost for coding the current image area needs to be obtained, wherein the triple tree split based coding cost corresponds to the triple tree split is performed on the current node, and the triple tree split comprises at least one of the horizontal triple tree split and the vertical triple tree split; and when the triple tree split based coding cost for coding the current image area needs to be obtained, performing the triple tree split on the current node;

determining the triple tree split based coding cost; and determining a split mode of the current node according to the horizontal binary tree split based coding cost, the vertical binary tree split based coding cost and the triple tree split based coding cost, wherein the split mode corresponding to a minimum coding cost in the horizontal binary tree split based coding cost, the vertical binary tree split based coding cost and the triple tree split based coding cost.

16. The apparatus according to claim 15, wherein the triple tree split comprises a horizontal triple tree split and a vertical triple tree split, the computer executable instructions further instruct the at least one processor to perform the steps of:

determining that the horizontal triple tree split based coding cost does not need to be obtained when the horizontal binary tree split based coding cost is greater than a product of the vertical binary tree split based coding cost and a first preset threshold; or determining that the vertical triple tree split based coding cost does not need to be obtained when the vertical binary tree split based coding cost is greater than a product of the horizontal binary tree split based coding cost and a second preset threshold.

* * * * *